United States Patent
Furuta et al.

(10) Patent No.: US 11,981,828 B2
(45) Date of Patent: May 14, 2024

(54) WATER REPELLENT AND OIL REPELLENT FILM COMPOSITION AND USE THEREOF

(71) Applicant: TOAGOSEI CO. LTD., Tokyo (JP)

(72) Inventors: Naomasa Furuta, Nagoya (JP);
Takeshi Fujita, Osaka (JP)

(73) Assignee: TOAGOSEI CO. LTD., Tokyo (JP)

( * ) Notice: Subject to any disclaimer, the term of this patent is extended or adjusted under 35 U.S.C. 154(b) by 610 days.

(21) Appl. No.: 16/972,264

(22) PCT Filed: Jun. 4, 2019

(86) PCT No.: PCT/JP2019/022238
§ 371 (c)(1),
(2) Date: Dec. 4, 2020

(87) PCT Pub. No.: WO2019/235497
PCT Pub. Date: Dec. 12, 2019

(65) Prior Publication Data
US 2021/0238445 A1 Aug. 5, 2021

(30) Foreign Application Priority Data

Jun. 4, 2018 (JP) ................. 2018-106769
Jun. 4, 2018 (JP) ................. 2018-106784

(51) Int. Cl.
| C09D 183/04 | (2006.01) |
| C08G 77/04 | (2006.01) |
| C08G 77/12 | (2006.01) |
| C08G 77/20 | (2006.01) |
| C08G 77/24 | (2006.01) |
| C09D 5/00 | (2006.01) |
| C08G 77/00 | (2006.01) |

(52) U.S. Cl.
CPC ......... C09D 183/04 (2013.01); C08G 77/045 (2013.01); C08G 77/12 (2013.01); C08G 77/20 (2013.01); C09D 5/00 (2013.01); C08G 77/70 (2013.01)

(58) Field of Classification Search
CPC ........... C07F 7/18; C08G 77/12; C08G 77/20; C08G 77/045; C09D 183/04; C09D 5/1637
See application file for complete search history.

(56) References Cited

U.S. PATENT DOCUMENTS

| 8,946,396 B2 * | 2/2015 | Reknes ............... C04B 16/04 106/726 |
| 2006/0058486 A1 | 3/2006 | Lautenschlager |
| 2006/0089478 A1 | 4/2006 | Noda |
| 2007/0134424 A1 | 6/2007 | Tauchi et al. |

(Continued)

FOREIGN PATENT DOCUMENTS

| EP | 444 960 A2 * | 9/1991 |
| EP | 3712199 A1 | 9/2020 |

(Continued)

OTHER PUBLICATIONS

Machine translation of JP 2011-249417 (no date).*

(Continued)

*Primary Examiner* — Marc S Zimmer
(74) *Attorney, Agent, or Firm* — Oliff PLC

(57) ABSTRACT

The present teaching provides a water repellant and oil repellant film composition comprising a siloxane compound represented by formula (1) or a cured product of the siloxane compound.

[C18]

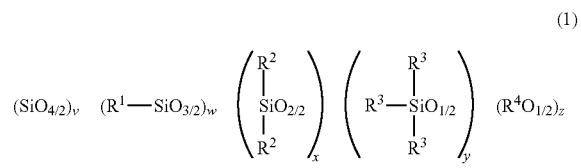

(1)

(In formula (1), each $R^1$ denotes at least one atom or group that is selected from the group consisting of a hydrogen atom, organic groups having 2 to 10 carbon atoms and a carbon-carbon unsaturated bond that is able to be hydrosilylated, and alkyl groups having 1 to 10 carbon atoms, each $R^2$ denotes at least one atom or group that is selected from the group consisting of a hydrogen atom, organic groups having 2 to 10 carbon atoms and a carbon-carbon unsaturated bond that is able to be hydrosilylated, and alkyl groups having 1 to 10 carbon atoms (the $R^2$ groups in a single molecule may be the same as, or different from, each other). Each $R^3$ denotes at least one atom or group that is selected from the group consisting of a hydrogen atom, organic groups having 2 to 10 carbon atoms and a carbon-carbon unsaturated bond that is able to be hydrosilylated, and alkyl groups having 1 to 10 carbon atoms (the $R^3$ groups in a single molecule may be the same as, or different from, each other), each $R^4$ denotes an alkyl group having 1 to 6 carbon atoms, and at least some of the $R^2$ groups or at least some of the $R^3$ groups are hydrogen atoms and organic groups having 2 to 10 carbon atoms and a carbon-carbon unsaturated bond that is able to be hydrosilylated. w and x each denote a positive number, v, y and z each denote 0 or a positive number, and the value of $x/(v+w+x+y)$ is 0.2 or more.)

16 Claims, No Drawings

(56) References Cited

U.S. PATENT DOCUMENTS

| | | |
|---|---|---|
| 2010/0029841 A1 | 2/2010 | Tauchi et al. |
| 2010/0280210 A1* | 11/2010 | Kitamura ............... C08G 77/20 528/31 |
| 2016/0194452 A1* | 7/2016 | Sandmeyer ............ C08G 77/04 528/31 |
| 2017/0015842 A1 | 1/2017 | Hozumi et al. |
| 2018/0371173 A1* | 12/2018 | Sandmeyer ............. H01L 33/56 |
| 2020/0010725 A1 | 1/2020 | Kotake et al. |

FOREIGN PATENT DOCUMENTS

| | | | |
|---|---|---|---|
| JP | 2000-319514 A | | 11/2000 |
| JP | 2003/171465 A | | 6/2003 |
| JP | 2006-117867 A | | 5/2006 |
| JP | 2011249417 A | * | 12/2011 |
| JP | 2013129709 A | * | 7/2013 |
| JP | 2014-185334 A | | 10/2014 |
| JP | 2015-044983 A | | 3/2015 |
| JP | 2018-058950 A | | 4/2018 |
| WO | 2005/010077 A1 | | 2/2005 |
| WO | 2009/066608 A1 | | 5/2009 |
| WO | 2012/157507 A1 | | 11/2012 |
| WO | 2018/142551 A1 | | 8/2018 |
| WO | 2019/098163 A1 | | 5/2019 |

OTHER PUBLICATIONS

Sep. 10, 2019 Written Opinion of the International Searching Authority issued in International Patent Application No. PCT/JP2019/022238.

Sep. 10, 2019 International Search Report issued in International Patent Application No. PCT/JP2019/022238.

Dec. 27, 2022 Office Action issued in Japanese Patent Application No. 2019-104883.

* cited by examiner

WATER REPELLENT AND OIL REPELLENT FILM COMPOSITION AND USE THEREOF

TECHNICAL FIELD

The present specification relates to a water repellent oil repellent film having excellent heat resistance and use thereof.

(Cross-reference to related applications) This application is a related application of Japanese Patent Applications 2018-106769 and 2018-106784, which are Japanese patent applications filed on Jun. 4, 2018, and claim priority based on these Japanese applications and all contents described in these Japanese applications shall be incorporated herein by reference.

BACKGROUND ART

Resin-based materials, such as silicone resins and fluororesins such as Teflon (registered trademark), and ceramic materials are known as materials for forming water repellent oil repellent films able to exhibit anti-fouling properties and the like. Resin-based materials can be easily coated and can be coated on a variety of workpieces. For example, cooking equipment such ovens, equipment located around cooking hobs, components located around engines and silencers of motor vehicles, space-heating equipment, hot water supply equipment, and the like, need to maintain anti-fouling properties every time when repeatedly heated.

The heat resistance temperature of coating films obtained from such resin-based materials is generally less than 300° C., meaning that applications of such films are limited. Therefore, there is a need for superior heat resistance. For example, a material in which a hydroxyl group at a terminal of a three-dimensional crosslinking structure of a siloxane bond is capped with a methyl group has been disclosed as this type of coating film material (Patent Literature 1). This document indicates that by using this material, a certain degree of water repellency and oil repellency is achieved even after heating at 500° C. for 24 hours.

In addition, a material in which a diisocyanate as a hydrophilic composition and a both-terminal-amino-modified polysiloxane and a hydroxyl group-modified polysiloxane as a hydrophobic composition are crosslinked using a glycidyl group-containing caged polysiloxane has also been disclosed (Patent Literature 2). This document indicates that this material has a decomposition temperature of approximately 300° C. as well as exhibiting water repellency and oil repellency.

Meanwhile, silsesquioxanes having a three-dimensionally crosslinked structure through siloxane bonds are known as materials having excellent heat resistance (Patent Literatures 3 and 4. These documents indicate that such silsesquioxanes have a 5% weight loss temperature of 1000° C. or higher.

CITATION LIST

Patent Literature

Patent Literature 1 Japanese Patent Application Publication No. 2014-185334
Patent Literature 2 Japanese Patent Application Publication No. 2015-44983
Patent Literature 3 WO 2005/10077
Patent Literature 4 WO 2009/66608

SUMMARY

A film disclosed in Patent Literature 1 above is obtained by polymerizing a solution of a silane compound having a polymerizable alkoxy group and a methyl group using an acid or an alkali as a catalyst at room temperature for a certain period of time so as to obtain a polysiloxane precursor solution, and then coating this precursor solution. Because it is difficult to regulate hydrolysis reactions of organic silane compounds, it is essential to use a catalyst such as an acid or an alkali, but applying a solution containing this type of catalyst to a workpiece leads to equipment-relating problems such as corrosion of solution transport equipment and coating equipment, and also leads to safety management problems in working environments.

In addition, the methyl group contributes to heat-resistant anti-fouling properties in the feature disclosed in Patent Literature 1 above, but in general, the molecular weight is low and many alkoxy groups and silanol groups remain. Therefore, because these condense at the time of film formation, stress increases, a film in which cracking or detachment readily occurs is formed, and the film ruptures if repeatedly heated, meaning that it is not possible to exhibit anti-fouling properties at high temperatures. In addition, the contact angle with water and n-hexadecane of the film disclosed in Patent Literature 1 above decreases at temperatures of 400° C. or higher, which leads to concerns regarding anti-fouling properties at 400° C. or higher (see Tables 1 and 2 etc.).

In addition, because a film disclosed in Patent Literature 2 above decomposes at temperatures of 300° C. or higher, it cannot be said that the material per se ensures heat resistance, and it cannot be said that the material exhibits heat-resistant anti-fouling properties.

In addition, liquid slide-off properties also contribute to anti-fouling properties. In some cases, it is important for water and oil to readily slide off so that droplets of these easily move from an anti-fouling surface. In addition, abrasion resistance of such films was insufficient in some cases.

Meanwhile, Patent Literatures 3 and 4 relate to polysiloxane materials that exhibit excellent heat resistance, but make no mention of water repellency and oil repellency. In addition, a person skilled in the art could not have foreseen that water repellency and oil repellency would be achieved from the compositions of these polysiloxane compositions.

The present description provides a water repellent oil repellent film material which exhibits excellent usability, such as film strength, anti-fouling properties and abrasion resistance, and also exhibits excellent heat resistance.

Solution to Technical Problem

In an attempt to avoid this problem, the inventors of the present teaching found that while focusing on polysiloxanes having excellent heat resistance, investigating various polysiloxane compositions and evaluating film characteristics, by specifying that monomers used for obtaining the polysiloxanes have certain types of composition, it was possible to form a film that exhibits excellent water repellency and oil repellency while maintaining the heat resistance of a polysiloxane. Furthermore, the inventors of the present teaching used a catalyst such as an acid for obtaining a polysiloxane, but found that a polysiloxane precursor following polymerization using the acid could provide a water repellent oil repellent film having excellent usability and heat resistance. Furthermore, the inventors of the present teaching found that by incorporating a silicone oil and a silicone resin in a polysiloxane, it was possible to provide a water repellent oil repellent film having excellent usability and heat resistance. The present description provides the following features on the basis of these findings.

[1] A water repellent oil repellent film composition, comprising:
a siloxane compound represented by formula (1) below.

[C1]

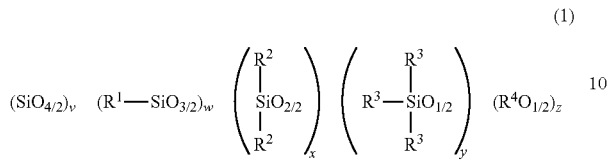

(1)

(In formula (1), each $R^1$ denotes at least one atom or group that is selected from the group consisting of a hydrogen atom, organic groups having 2 to 10 carbon atoms and a carbon-carbon unsaturated bond that is able to be hydrosilylated, and alkyl groups having 1 to 10 carbon atoms, each $R^2$ denotes at least one atom or group that is selected from the group consisting of a hydrogen atom, organic groups having 2 to 10 carbon atoms and a carbon-carbon unsaturated bond that is able to be hydrosilylated, and alkyl groups having 1 to 10 carbon atoms (the $R^2$ groups in a single molecule may be the same as, or different from, each other). Each $R^3$ denotes at least one atom or group that is selected from the group consisting of a hydrogen atom, organic groups having 2 to 10 carbon atoms and a carbon-carbon unsaturated bond that is able to be hydrosilylated, and alkyl groups having 1 to 10 carbon atoms (the $R^3$ groups in a single molecule may be the same as, or different from, each other), each $R^4$ denotes an alkyl group having 1 to 6 carbon atoms, and at least some of the $R^2$ groups or at least some of the $R^3$ groups are hydrogen atoms and organic groups having 2 to 10 carbon atoms and a carbon-carbon unsaturated bond that is able to be hydrosilylated. w and x each denote a positive number, v, y and z each denote 0 or a positive number, and the value of $x/(v+w+x+y)$ is 0.2 or more.)

[2] The composition according to [1], wherein at least a part of $(R^3)_3SiO_{1/2}$ moieties are such that one $R^3$ group is a hydrogen atom and the other two $R^3$ groups are alkyl groups having 1 to 10 carbon atoms, and at least the other part of $(R^3)_3SiO_{1/2}$ moieties are such that one $R^3$ group is an organic group having 2 to 10 carbon atoms and a carbon-carbon unsaturated bond that is able to be hydrosilylated and the other two $R^3$ groups are alkyl groups having 1 to 10 carbon atoms.

[3] The composition according to [2], wherein the value of $(y1+y2)/(v+w+x+y)$ is 0.1 or more, where y1 denotes the number of moles of the at least a part of $(R^3)_3SiO_{1/2}$ moieties and y2 denotes the number of moles of the at least the other part of $(R^3)_3SiO_{1/2}$ moieties.

[4] The composition according to any one of [1] to [3], wherein at least a part of $(R^2)_2SiO_{2/2}$ moieties are such that one $R^2$ group is a hydrogen atom and the other $R^2$ group is an alkyl group having 1 to 10 carbon atoms, and at least the other part of $(R^2)_2SiO_{2/2}$ moieties are such that one $R^2$ group is an organic group having 2 to 10 carbon atoms and a carbon-carbon unsaturated bond that is able to be hydrosilylated and the other $R^2$ group is an alkyl group having 1 to 10 carbon atoms.

[5] The composition according to [4], wherein the value of $(x1+x2)/(v+w+x+y)$ is 0.1 or more, where x1 denotes the number of moles of the at least a part of $(R^2)_2SiO_{2/2}$ moieties and x2 denotes the number of moles of the at least other part of $(R^2)_2SiO_{2/2}$ moieties.

[6] The composition according to any one of [1] to [5], wherein $R^1$ is an alkyl group having 1 to 10 carbon atoms.

[7] The composition according to any one of [1] to [6], wherein the value of x/w is 0.8 or more.

[8] The composition according to any one of [1] to [7], wherein the siloxane compound is constituted so that the number of moles of Si—C—C—$R_m$—Si (R is an organic group having 1 to 8 carbon atoms and m is an integer of 0 or 1) derived from a hydrosilylation reaction between a hydrogen atom and an organic group having 2 to 10 carbon atoms and a carbon-carbon unsaturated bond that is able to be hydrosilylated is 0.05 or more and 0.3 or less of the total number of moles of Si in the siloxane compound.

[9] The composition according to any one of [1] to [8], wherein in the siloxane compound, the number of moles of hydrogen atoms that are in a theoretical excess over the organic group having 2 to 10 carbon atoms and a carbon-carbon unsaturated bond that is able to be hydrosilylated is 0.1 or less relative to the total number of moles of Si.

[10] The composition according to any one of [1] to [9], wherein in the siloxane compound, a Si—C—C—$R_m$—Si structure (R is an organic group having 1 to 8 carbon atoms and m is an integer of 0 or 1) is formed by at least a part of the organic groups having 2 to 10 carbon atoms and a carbon-carbon unsaturated bond that is able to be hydrosilylated and at least a part of the hydrogen atoms.

[11] The composition according to any one of [1] to [10], wherein the number average molecular weight of the siloxane compound is 500 or more and 2000 or less.

[12] The composition according to any one of [1] to [11], which further comprises a linear organopolysiloxane component represented by formula (2) below.

[C2]

(2)

(In formula (2), the $R^1$ groups each independently denote a methyl group, an ethyl group, a propyl group, a cyclohexyl group or a phenyl group. m is an integer of 1 or more.)

[13] The water repellent oil repellent composition according to [12], wherein the linear organopolysiloxane is represented by formula (3) below.

[C3]

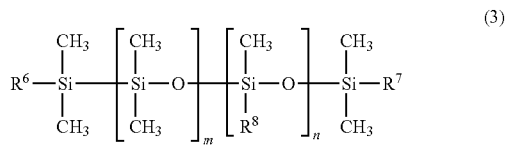

(3)

(In formula (3), $R^6$ and $R^7$ are each independently at least one type selected from among a hydroxyl group, an alkyl group having 1 to 3 carbon atoms, an alkoxy group having 1 to 3 carbon atoms, an amino group, an epoxy group, a mercapto group, a carboxyl group, a polyether group, a phenyl group, a (meth)acrylic group, a carbinol group and a carboxylic acid anhydride group, and these groups may be the same as, or different from, each other. $R^8$ is at least one type selected from among an alkyl group having 1 to 20 carbon atoms, a phenyl group, a polyether group, an aralkyl group, a fluoroalkyl group, a fatty acid ester group and a fatty acid amide group. m is an integer of 1 or more, and n is an integer of 1 or more.)

[14] The water repellent oil repellent film composition according to [12] or [13], which further comprises a branched organopolysiloxane represented by formula (4) below.

[C4]

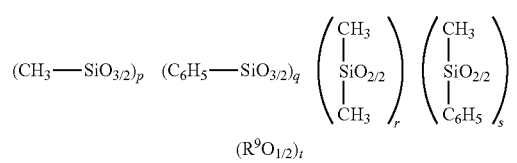

(4)

(In formula (4), p>0, q>0, r≥0, s≥0, and (p+2r+s)>q+s, and $R^9$ is a hydrogen atom or an alkyl group having 1 to 6 carbon atoms.)

[15] The composition according to any one of [12] to [14], wherein the amount of the siloxane compound is 5 mass % or more and 95 mass % or less relative to the total amount of the siloxane compound and the branched organopolysiloxane, and the amount of the linear organopolysiloxane is 1 mass % or more and 50 mass % or less relative to the total amount of the siloxane compound and the branched organopolysiloxane.

[16] The composition according to [14] or [15], wherein the branched organopolysiloxane has a weight average molecular weight of 2000 or more.

[17] The composition according to any one of [1] to [16], which comprises substantially no hydrochloric acid or alkali.

[18] The composition according to any one of [1] to [17], which comprises substantially no catalyst for facilitating hydrosilylation.

[19] The composition according to any one of [1] to [18], which is a film-shaped body.

[20] A composition for obtaining a water repellent oil repellent film, the composition comprising three or more silane compounds for obtaining a siloxane compound represented by formula (1) below.

[C5]

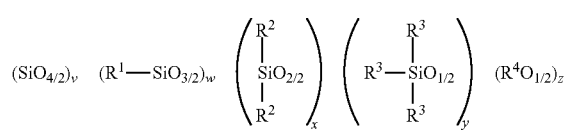

(1)

(In formula (1), each $R^1$ denotes at least one atom or group that is selected from the group consisting of a hydrogen atom, organic groups having 2 to 10 carbon atoms and a carbon-carbon unsaturated bond that is able to be hydrosilylated, and alkyl groups having 1 to 10 carbon atoms, each $R^2$ denotes at least one atom or group that is selected from the group consisting of a hydrogen atom, organic groups having 2 to 10 carbon atoms and a carbon-carbon unsaturated bond that is able to be hydrosilylated, and alkyl groups having 1 to 10 carbon atoms (the $R^2$ groups in a single molecule may be the same as, or different from, each other). Each $R^3$ denotes at least one atom or group that is selected from the group consisting of a hydrogen atom, organic groups having 2 to 10 carbon atoms and a carbon-carbon unsaturated bond that is able to be hydrosilylated, and alkyl groups having 1 to 10 carbon atoms (the $R^3$ groups in a single molecule may be the same as, or different from, each other), each $R^4$ denotes an alkyl group having 1 to 6 carbon atoms, and at least some of the $R^2$ groups or at least some of the $R^3$ groups are hydrogen atoms and organic groups having 2 to 10 carbon atoms and a carbon-carbon unsaturated bond that is able to be hydrosilylated. w and x each denote a positive number, v, y and z each denote 0 or a positive number, and the value of x/(v+w+x+y) is 0.2 or more.)

[21] A siloxane compound represented by formula (1) below.

[C6]

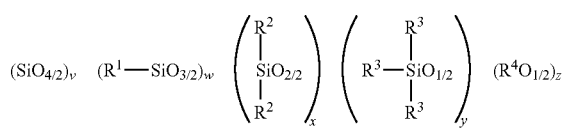

(1)

(In formula (1), each $R^1$ denotes at least one atom or group that is selected from the group consisting of a hydrogen atom, organic groups having 2 to 10 carbon atoms and a carbon-carbon unsaturated bond that is able to be hydrosilylated, and alkyl groups having 1 to 10 carbon atoms, each $R^2$ denotes at least one atom or group that is selected from the group consisting of a hydrogen atom, organic groups having 2 to 10 carbon atoms and a carbon-carbon unsaturated bond that is able to be hydrosilylated, and alkyl groups having 1 to 10 carbon atoms (the $R^2$ groups in a single molecule may be the same as, or different from, each other). Each $R^3$ denotes at least one atom or group that is selected from the group consisting of a hydrogen atom, organic groups having 2 to 10 carbon atoms and a carbon-carbon unsaturated bond that is able to be hydrosilylated, and alkyl groups having 1 to 10 carbon atoms (the $R^3$ groups in a single molecule may be the same as, or different from, each other), each $R^4$ denotes an alkyl group having 1 to 6 carbon atoms, and at least some of the $R^2$ groups or at least some of the $R^3$ groups are hydrogen atoms and organic groups having 2 to 10 carbon atoms and a carbon-carbon unsaturated bond that is able to be hydrosilylated. w and x each denote a positive number, v, y and z each denote 0 or a positive number, and the value of x/(v+w+x+y) is 0.2 or more.)

[22] The siloxane compound according to [21], which further has any of characteristics (1) to (4) below.

(1) At least some $(R^3)_3SiO_{1/2}$ moieties are such that one $R^3$ group is a hydrogen atom and the other two $R^3$ groups are alkyl groups having 1 to 10 carbon atoms, and at least some other $(R^3)_3SiO_{1/2}$ moieties are such that one $R^3$ group is an organic group having 2 to 10 carbon atoms and a carbon-carbon unsaturated bond that is able to be hydrosilylated and the other two $R^3$ groups are alkyl groups having 1 to 10 carbon atoms.

(2) The value of (y1+y2)/(v+w+x+y) is 0.1 or more, where y1 denotes the number of moles of the at least some $(R^3)_3SiO_{1/2}$ moieties and y2 denotes the number of moles of the at least some other $(R^3)_3SiO_{1/2}$ moieties.

(3) At least some $(R^2)_2SiO_{2/2}$ moieties are such that one $R^2$ group is a hydrogen atom and the other $R^2$ group is an alkyl group having 1 to 10 carbon atoms, and at least some other $(R^2)_2SiO_{2/2}$ moieties are such that one $R^2$ group is an organic group having 2 to 10 carbon atoms and a carbon-carbon unsaturated bond that is able to be hydrosilylated and the other $R^2$ group is an alkyl group having 1 to 10 carbon atoms.

(4) The value of (x1+x2)/(v+w+x+y) is 0.1 or more, where x1 denotes the number of moles of the at least some $(R^2)_2SiO_{2/2}$ moieties and x2 denotes the number of moles of the at least some other $(R^2)_2SiO_{2/2}$ moieties.

[23] A method for imparting a substrate with heat-resistant anti-fouling properties, the method comprising:
coating a surface of the substrate with the composition according to any one of [1] to [18], and
heating the composition so as to form a cured film.

[24] A water repellent oil repellent film obtained by curing the composition according to any one of [1] to [18].

[25] The water repellent oil repellent film according to [24], which is obtained by curing without using a catalyst for facilitating hydrosilylation.

[26] An apparatus comprising:
a heating chamber and
the film-shaped composition according to any one of [1] to [18], which is provided on at least a part of the heating chamber, which is an element surface that is exposed to heat.

[27] A structure in which the composition according to any one of [1] to [18] is provided on a surface that is exposed to heat.

DESCRIPTION OF EMBODIMENTS

Teachings in the present description disclose a water repellent oil repellent film composition and use thereof. More specifically, teachings in the present description disclose a water repellent oil repellent film composition; a composition for obtaining a water repellent oil repellent film; a siloxane compound; a heat-resistant anti-fouling method; a water repellent oil repellent film, and the like. According to the present teachings, it is possible to provide a water repellent oil repellent film which exhibits excellent usability and exhibits excellent anti-fouling properties at high temperatures. For example, said water repellent oil repellent film can exhibit characteristics such as exhibiting excellent storage stability and coatability, being soluble in commonly used solvents, suppressing corrosion of equipment and adverse effects on working environments, and being able to maintain excellent water repellency and oil repellency even after being heated for 24 hours at 400° C.

In addition, in cases where the composition further contains a silicone oil or the like, it is possible to provide a water repellent oil repellent film which exhibits excellent water repellency and oil repellency at high temperatures, exhibits good film formation properties and exhibits sufficient film strength to be able to resist heating and abrasion. Furthermore, because it is possible to provide a water repellent oil repellent film having excellent liquid slide-off properties in such a case, it is possible to provide a water repellent oil repellent film which exhibits excellent water repellency, oil repellency and abrasion resistance and also exhibits excellent removal and recovery properties of moisture and oils.

The following provides a detailed explanation of representative, non-limiting specific examples of the present disclosure with suitable reference to the drawings. This detailed explanation is merely intended to indicate details for carrying out preferable examples of the present disclosure to a person with ordinary skill in the art, and is not intended to limit the scope of the present disclosure. In addition, additional characteristics and inventions disclosed below can be used separately or in combination with other characteristics and inventions in order to further improve a water repellent oil repellent film composition and use thereof.

In addition, combinations of the characteristics and steps disclosed in the following detailed explanation are not essential for carrying out the present disclosure in the broad sense, and are only described to explain representative detailed examples of the present disclosure in particular. Moreover, the various characteristics of the above-mentioned and forthcoming representative specific examples along with the various characteristics disclosed in independent and dependent claims are not required to be combined as described in the specific examples described herein or in the order in which they are listed in the providing of additional and useful embodiments of the present disclosure.

All characteristics described in the present description and/or claims are intended to be disclosed separately and mutually independently from the constitution of the characteristics described in the examples and/or claims while limiting to the disclosure and claimed specified matters at the time of initial filing. Moreover, all descriptions relating to numerical ranges and groups or populations are intended to disclose intermediate constitutions thereof while limiting to the disclosure and claimed specified matters at the time of initial filing.

In the present description, the term carbon-carbon unsaturated bond means a carbon-carbon double bond or a carbon-carbon triple bond. Siloxane compounds and methods for producing same will now be explained as embodiments disclosed in the present teachings, and explanations will then be given of water repellent oil repellent compositions containing said siloxane compounds or cured products thereof, and use thereof.

(Siloxane Compound)

The siloxane compound in the present teachings (hereinafter referred to simply as the siloxane compound) is a polysiloxane having a Si—O—Si bond in the main chain skeleton. In addition, the siloxane compound includes constituent units having three $Si—O_{1/2}$ moieties for forming siloxane bonds in formula (1) (T units; $R^1$—Si—$O_{3/2}$) as essential units, and is therefore also a silsesquioxane derivative.

The siloxane compound can be represented by formula (1) below, which includes, for example, constituent units (1-1), (1-2), (1-3), (1-4) and (1-5). In formula (1), v, w, x, y and z denote the number of moles of constituent units (1-1) to (1-5) respectively. Moreover, in formula (1), the values of v, w, x, y and z are average values of the ratio of the number of moles of these constituent units contained in one molecule of the siloxane compound. The formulae of these constituent units also indicate the number of moles of the constituent units.

The siloxane compound may include only one type of constituent units (1-2) to (1-5) in formula (1), or include two or more types thereof. In addition, the actual manner in which constituent units are condensed in the siloxane compound is not limited to the order of arrangement shown in formula (1), and is not particularly limited.

[C7]

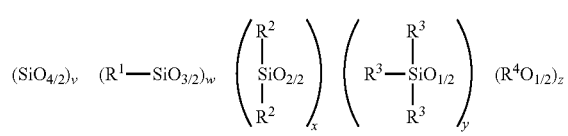
(1)

[C8]

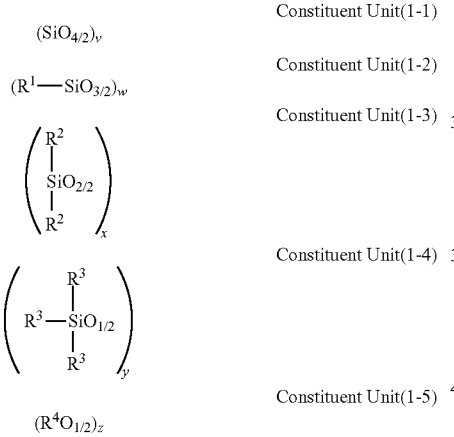

Constituent Unit(1-1)
Constituent Unit(1-2)
Constituent Unit(1-3)
Constituent Unit(1-4)
Constituent Unit(1-5)

The siloxane compound can include a combination of constituent units selected from among the five types of constituent unit in formula (1), that is, constituent unit (1-1), constituent unit (1-2), constituent unit (1-3), constituent unit (1-4) and constituent unit (1-5), and an organic group having 2 to 10 carbon atoms (hereinafter referred to simply as an unsaturated organic group), which includes a hydrogen atom (in other words, a hydrosilyl (Si—H) group) and a carbon-carbon unsaturated bond that is able to be hydrosilylated. That is, the siloxane compound can include one or two or more types of constituent unit selected from the group consisting of constituent unit (1-2), constituent unit (1-3) and constituent unit (1-4) as constituent units containing a hydrosilyl group and one or two or more types selected from the group consisting of constituent unit (1-2), constituent unit (1-3) and constituent unit (1-4) as constituent units containing an unsaturated organic group.

In addition, the siloxane compound may contain constituent unit (1-2) and constituent unit (1-3). For example, in formula (1), w and x are positive numbers and v, y and z are 0 or positive numbers.

<Constituent Unit (1-1)>
The present constituent unit is represented by formula (1), but defines a Q unit that is a basic constituent unit of the polysiloxane. The number of present constituent units in the siloxane compound is not particularly limited.

<Constituent Unit (1-2)>
The present constituent unit defines a T unit that is a basic constituent unit of the polysiloxane. $R^1$ in the present constituent unit can be at least one atom or group that is selected from the group consisting of a hydrogen atom, unsaturated organic groups and alkyl groups having 1 to 10 carbon atoms (hereinafter referred to simply as $C_{1-10}$ alkyl groups). For example, $R^1$ can be an alkyl group having 1 to 10 carbon atoms instead of a hydrogen atom or an unsaturated organic group. In cases where the present constituent unit does not have a group that is involved in a hydrosilylation reaction, it may be possible to obtain a film that exhibits excellent high temperature heat resistance and the like. Moreover, explanations of unsaturated organic groups are given later.

$C_{1-10}$ alkyl groups may be aliphatic groups or alicyclic groups, and may be straight chain or branched groups. Specific examples of alkyl groups include methyl groups, ethyl groups, propyl groups, butyl groups, pentyl groups, hexyl groups, heptyl groups, octyl groups, nonyl groups and decyl groups. Such alkyl groups are, for example, straight chain alkyl groups having 1 to 6 carbon atoms, such as methyl groups, ethyl groups, propyl groups, butyl groups, pentyl groups and hexyl groups, or straight chain alkyl groups having 1 to 4 carbon atoms, such as methyl groups, ethyl groups, propyl groups and butyl groups. For example, methyl groups.

w, which is the ratio of the number of moles of the present constituent unit in the siloxane compound, is a positive number. The value of w is not particularly limited, but is such that, for example, the value of w/(v+w+x+y) is, for example, 0.25 or more, 0.3 or more, 0.35 or more, or 0.4 or more. This numerical value is, for example, 0.65 or less, 0.5 or less, or 0.45 or less. Due to this, it is possible to impart an anti-fouling siloxane compound with appropriate heat resistance. In addition, an appropriate numerical range is, for example, 0.35 or more and 0.65 or less, or 0.40 or more and 0.5 or less.

The actual number of present constituent units in one molecule of the siloxane compound is not particularly limited, but is, for example, 1 or more and 40 or less, preferably 2 or more and 20 or less, and more preferably 3 or more and 10 or less.

<Constituent Unit (1-3)>
The present constituent unit defines a D unit that is a basic constituent unit of the polysiloxane. $R^2$ in the present constituent unit can be at least one atom or group that is selected from the group consisting of a hydrogen atom, unsaturated organic groups and $C_{1-10}$ alkyl groups.

The various types of $C_{1-10}$ alkyl groups described above can also be used for the present constituent unit.

The unsaturated organic group is a functional group having a carbon-carbon double bond or carbon-carbon triple bond that is able to be hydrosilylated with a hydrogen atom bonded to a silicon atom (a hydrosilyl group). Despite not being particularly limited, an example thereof is a carbon-carbon double bond. Despite not being particularly limited, specific examples of said unsaturated organic group include vinyl groups, ortho-styryl groups, meta-styryl groups, para-styryl groups, acryloyl groups, methacryloyl groups, acryloxy groups, methacryloxy groups, 1-propenyl groups, 1-butenyl groups, 1-pentenyl groups, 3-methyl-1-butenyl groups, phenylethenyl groups, ethynyl groups, 1-propynyl groups, 1-butynyl groups, 1-pentynyl groups, 3-methyl-1-butynyl groups, phenylbutynyl groups, allyl(2-propenyl) groups and octenyl (7-octen-1-yl) groups. Said unsaturated organic group is, for example, a vinyl group, a para-styryl group, an allyl(2-propenyl) group or an octenyl (7-octen-1-yl) group, and is, for example, a vinyl group.

Moreover, it is possible to use two or more unsaturated organic groups in the siloxane compound as a whole, but in such cases, all of the unsaturated organic groups may be the same as, or different from, each other. In addition, a plurality of unsaturated organic groups may be the same as each other, but may include different unsaturated organic groups.

The $R^2$ groups in the present constituent unit may be the same as, or different from, each other. In addition, it is possible to use one unsaturated organic group or a plurality thereof as $R^2$ in one present constituent unit or a plurality thereof. It is possible to use one $C_{1-10}$ alkyl group or a plurality thereof as $R^2$ in one present constituent unit or a plurality thereof.

In the siloxane compound, at least a part of the present constituent unit is such that, for example, the two $R^2$ groups are both $C_{1-10}$ alkyl groups or, for example, all of the present constituent unit is such that the two $R^2$ groups are $C_{1-10}$ alkyl groups. For example, the present constituent unit is such that, for example, the two $R^2$ groups are both alkyl groups having 1 to 4 carbon atoms or, for example, the two $R^2$ groups are both methyl groups. Due to this, it is possible to achieve an appropriate degree of compatibility with a linear organopolysiloxane which is described later (for example, a compound having a dimethylpolysiloxane structure).

The siloxane compound is such that the two $R^2$ groups in a part of the present constituent unit are both $C_{1-10}$ alkyl groups and in another part of the present constituent unit, for example, one $R^2$ group is a hydrogen atom and the other $R^2$ group is a $C_{1-10}$ alkyl group, and in yet another part of the present constituent unit, one $R^2$ group is an unsaturated organic group and the other $R^2$ group is a $C_{1-10}$ alkyl group. In addition, the siloxane compound is, for example, such that the two $R^2$ groups in a part of the present constituent unit are both $C_{1-10}$ alkyl groups and in another part of the present constituent unit, for example, one $R^2$ group is a hydrogen atom and the other $R^2$ group is a $C_{1-10}$ alkyl group, and in the remaining part of the present constituent unit, one $R^2$ group is an unsaturated organic group and the other $R^2$ group is a $C_{1-10}$ alkyl group. Due to this, it is possible to form a branched Si—C—C—$R_m$—Si moiety (R is an organic group having 1 to 8 carbon atoms and m is an integer of 0 or 1. In addition, R corresponds to a structural moiety excluding a —C—C— bond, which is produced by a hydrosilylation reaction of an unsaturated organic group involved in the hydrosilylation reaction) from a polysiloxane skeleton in a hydrosilylation reaction, and curing properties and cured product heat resistance are improved. For example, a Si—C—C—Si moiety in which an unsaturated organic group of $R^2$ is a vinyl group and the value of m in the branched structure is 0.

In addition, if x1 denotes the number of moles of the present structural unit in which one $R^2$ group is a hydrogen atom and the other $R^2$ group is a $C_{1-10}$ alkyl group and x2 denotes the number of moles of the present constituent unit in which one $R^2$ group is an unsaturated organic group and the other $R^2$ group is a $C_{1-10}$ alkyl group, the value of (x1+x2)/(v+w+x+y) is, for example, 0.1 or more, for example 0.15 or more, or for example 0.18 or more. This numerical value is, for example, 0.4 or less, 0.3 or less, or 0.25 or less. In addition, an appropriate numerical range is, for example, 0.1 or more and 0.4 or less, or 0.18 or more and 0.25 or less.

x, which is the ratio of the number of moles of the present constituent unit in the siloxane compound, is a positive number. The value of x is not particularly limited, but is such that the value of x/(v+w+x+y) is, for example, 0.2 or more, 0.3 or more, 0.35 or more, or 0.4 or more. This numerical value is, for example, less than 0.5, or 0.45 or less. This is because if this number of moles x is high, anti-fouling properties are improved, but if this number of moles is too high, heat resistance deteriorates. In addition, an appropriate numerical range is, for example not less than 0.2 and less than 0.5, or 0.3 or more and 0.45 or less.

In addition, with regard to the relationship with w in constituent unit (1-2) mentioned above, the value of x/w is, for example, 0.2 or more, 0.5 or more, 0.7 or more, 0.8 or more, or 0.9 or more, and is, for example, 1.4 or less, 1.2 or less, or 1.1 or less. This is because a preferred balance between heat resistance and anti-fouling is achieved. In addition, an appropriate numerical range is, for example 0.2 or more and 1.4 or less, or 0.7 or more and 1.2 or less.

The actual number of present constituent units in one molecule of the siloxane compound is not particularly limited, but is, for example, 1 or more and 40 or less, preferably 2 or more and 20 or less, and more preferably 3 or more and 10 or less.

<Constituent Unit (1-4)>

The present constituent unit defines an M unit that is a basic constituent unit of the polysiloxane. $R^3$ in the present constituent unit can be at least one atom or group that is selected from the group consisting of a hydrogen atom, unsaturated organic groups and $C_{1-10}$ alkyl groups.

The various types of unsaturated organic groups and $C_{1-10}$ alkyl groups described above can also be used for the present constituent unit.

The $R^3$ groups in the present constituent unit may be the same as, or different from, each other. In addition, it is possible to use one unsaturated organic group or a plurality thereof as $R^3$ in one present constituent unit or a plurality thereof. It is possible to use one $C_{1-10}$ alkyl group or a plurality thereof as $R^3$ in one present constituent unit or a plurality thereof.

Moreover, in the siloxane compound, a hydrogen atom and an unsaturated organic group able to be hydrosilylated may be present only in the present constituent unit, a hydrogen atom and an unsaturated organic group able to be hydrosilylated may be present only in constituent unit (1-3) mentioned above, and a hydrogen atom and an unsaturated organic group able to be hydrosilylated may be present in both the present constituent unit and constituent unit (1-3).

In at least a part of the present constituent unit in the siloxane compound, for example, two $R^3$ groups are both $C_{1-10}$ alkyl groups and the other $R^3$ group is a hydrogen atom or an unsaturated organic group.

In a part of the present constituent unit in the siloxane compound, one $R^3$ group is a hydrogen atom and the other two $R^3$ groups are both $C_{1-10}$ alkyl groups, and in another part of the present constituent unit, one $R^3$ group is an unsaturated hydrocarbon group and the other two $R^3$ groups are both $C_{1-10}$ alkyl groups. In addition, in a part of the present constituent unit, for example, one $R^3$ group is a hydrogen atom and the other two $R^3$ groups are both $C_{1-10}$ alkyl groups, and in all other parts of the present constituent unit, one $R^3$ group is an unsaturated hydrocarbon group and the other two $R^3$ groups are both $C_{1-10}$ alkyl groups. Due to this, a Si—C—C—$R_m$—Si moiety (in which R is an organic group having 1 to 8 carbon atoms, and m is an integer of 0 or 1) can be formed in a linear part of the polysiloxane skeleton, and heat resistance is improved. For example, a Si—C—C—Si moiety in which an unsaturated organic group of $R^3$ is a vinyl group and the value of m in the branched structure is 0.

In addition, if y1 denotes the number of moles of the present structural unit in which one $R^3$ group is a hydrogen atom and the other two $R^3$ groups are $C_{1-10}$ alkyl groups and y2 denotes the number of moles of the present constituent unit in which one $R^3$ group is an unsaturated organic group and the other two $R^3$ groups are $C_{1-10}$ alkyl groups, the value of (y1+y2)/(v+w+x+y) is, for example, 0.1 or more, 0.15 or more, or 0.18 or more. This numerical value is, for example, 0.4 or less, 0.3 or less, or 0.25 or less. In addition, an appropriate numerical range is, for example, 0.1 or more and 0.4 or less, or 0.18 or more and 0.25 or less.

y, which is the ratio of the number of moles of the present constituent unit in the siloxane compound, is 0 or a positive number. In cases where constituent unit (1-2) does not have a hydrogen atom and/or an unsaturated organic group, y is a positive number. The value of y is not particularly limited, but is such that the value of y/(v+w+x+y) is, for example, 0.1 or more, 0.15 or more, or 0.18 or more. In addition, this value is, for example, 0.4 or less, 0.3 or less, or 0.25 or less. This is because it is possible to achieve appropriate crosslinking reaction properties and heat resistance. In addition, an appropriate numerical range is, for example, 0.1 or more and 0.4 or less, or 0.18 or more and 0.25 or less.

The actual number of present constituent units in one molecule of the siloxane compound is not particularly limited, but is, for example, 0 or more and 20 or less, preferably 1 or more and 10 or less, and more preferably 1 or more and 5 or less.

<Constituent Unit (1-5)>

The present constituent unit defines a unit containing an alkoxy group or a hydroxyl group in the siloxane compound. That is, the $R^4$ group in the present constituent unit is a hydrogen atom or an alkyl group having 1 to 10 carbon atoms. This alkyl group may be an aliphatic group or an alicyclic group, and may be a straight chain or branched group. Specific examples of the alkyl group include a methyl group, an ethyl group, an n-propyl group, an isopropyl group, an n-butyl group, a sec-butyl group, a tert-butyl group, an isobutyl group, a pentyl group and a hexyl group. Typical examples thereof are an alkyl group having 2 or more and 10 or less carbon atoms or an alkyl group having 1 to 6 carbon atoms, such as a methyl group, an ethyl group, an n-propyl group, an isopropyl group, an n-butyl group, a sec-butyl group, a tert-butyl group or an isobutyl group.

An alkoxy group in the present constituent unit is an "alkoxy group" that is a hydrolyzable group contained in a raw material monomer mentioned later or an "alkoxy group" produced by an alcohol contained in a reaction solvent being replaced by a hydrolyzable group in a raw material monomer, and remains in the molecule without being hydrolyzed/polycondensed. In addition, a hydroxyl group in the present constituent unit is a hydroxyl group or the like that remains in the molecule after an "alkoxy group" is not polycondensed after being hydrolyzed.

z, which is the ratio of the number of moles of the present constituent unit in the siloxane compound, is 0 or a positive number. The actual number of present constituent units in one molecule of the siloxane compound is not particularly limited, but is, for example, 0 or more and 5 or less, preferably 0 or more and 3 or less, and more preferably 0 or more and 2 or less.

(Number of Moles of Hydrosilyl Groups and Unsaturated Organic Groups in Siloxane Compound)

The siloxane compound can contain a hydrosilyl group and an unsaturated organic group in one or two or more types of constituent unit selected from among the three types of constituent unit (1-2) to (1-4) mentioned above. For example, a combination of constituent units having these groups is one or two or more types of constituent unit selected from among constituent unit (1-3) and constituent unit (1-4).

The siloxane compound is constituted in such a way that, for example, the number of moles of a Si—C—C—$R_m$—Si constituent moiety (R is an organic group having 1 to 8 carbon atoms and m is an integer of 0 or 1) derived from a hydrosilylation reaction between a hydrosilyl group and an unsaturated organic group is 0.05 or more and 0.3 or less of the total number of moles of Si in the siloxane compound, that is, 0.05 to 0.3 times the value of (v+w+x+y). In addition, this value is, for example, 0.05 or more and 0.25 or less, 0.07 or more and 0.25 or less, or 0.08 or more and 0.2 or less. This is because a good balance can be achieved between curing properties and anti-fouling properties. Moreover, the number of moles of a Si—C—C—$R_m$—Si constituent moiety derived from a hydrosilylation reaction between a hydrosilyl group and an unsaturated organic group is a theoretical value obtained by supposing that hydrosilyl groups and unsaturated organic groups in the siloxane compound completely react at a ratio of 1:1. In cases where hydrosilyl groups or unsaturated organic groups are present in excess, the calculation is made on the basis of a lower number of groups. A crosslinked structure derived from a hydrosilylation reaction is, for example, a Si—C—C—Si structure in which an unsaturated organic group is a vinyl group and the value of m in the structure is 0.

In the siloxane compound, the number of moles of hydrosilyl groups (hydrogen atoms) that are in a theoretical excess relative to unsaturated organic groups is, for example, 0.3 or less, 0.25 or less, 0.2 or less, 0.15 or less or 0.1 or less, relative to the total number of moles of Si. If the excess amount of hydrosilyl groups is too high, oxidation readily occurs at the time of heating, which is a cause of OH groups, which cause a reduction in anti-fouling properties. In addition, an appropriate numerical range is, for example 0.05 or more and 0.4 or less, or 0.07 or more and 0.3 or less. Moreover, it is thought that this tendency is noticeable in cases where excess hydrosilyl groups are contained in T structures. That is, in cases where excess hydrosilyl groups are present in T structures, oxidized hydrosilyl groups tend to remain as Si—OH groups as a result of steric hindrance caused by T structures. Meanwhile, in cases where excess hydrosilyl groups are present in D structures and M structures, it can be said that oxidized hydrosilyl groups readily undergo dehydrating compensation and form siloxane bonds. Therefore, in the siloxane compound, it is preferable for the amount of hydrosilyl groups to be low in T structures as constituent units, with the amount of hydrosilyl groups being 0.2 or less relative to the total number of moles of Si, and this amount is, for example, 0.1 or less, 0.05 or less, or 0. Due to this, it is possible to achieve a good balance between heat resistance and anti-fouling properties.

<Molecular Weight and the Like>

The number average molecular weight of the siloxane compound is preferably within the range 300 to 10,000. The siloxane compound per se exhibits low viscosity, readily dissolves in organic solvents, has a viscosity in solution that facilitates handling, and exhibits excellent storage stability. In view of coatability, storage stability, heat resistance, spray coatability and the like, the number average molecular weight is preferably 300 to 8000, preferably 300 to 6000, preferably 300 to 3000, preferably 300 to 2000 and preferably 500 to 2000. In addition, the number average molecular weight is, for example, 500 to 1500 from the perspectives of spin coatability and storage stability, and is, for example, 1000 to 2000 from the perspectives of heat resistance and spray coatability. The number average molecular weight can be determined using GPC (gel permeation chromatography) under measurement conditions described below (in the embodiments section) using polystyrene as a standard substance.

The siloxane compound is a liquid and has a viscosity at 25° C. of preferably 30,000 mPa·s or less, more preferably 10,000 mPa·s, further preferably 5000 mPa·s or less, particularly preferably 3000 mPa·s or less, and particularly preferably 1000 mPa·s or less. Furthermore, this viscosity is preferably 100 mPa·s or less. However, the lower limit for this viscosity is generally 1 mPa·s.

The siloxane compound per se described above is a novel polysiloxane, and can be specified in greater detail by, for example, one or two or more of (1) to (4) below.

(1) At least some $(R^3)_3SiO_{1/2}$ moieties are such that one $R^3$ group is a hydrogen atom and the other two $R^3$ groups are alkyl groups having 1 to 10 carbon atoms, and at least some other $(R^3)_3SiO_{1/2}$ moieties are such that one $R^3$ group is an organic group having 2 to 10 carbon atoms and a carbon-carbon unsaturated bond that is able to be hydrosilylated and the other two $R^3$ groups are alkyl groups having 1 to 10 carbon atoms.

(2) The value of $(y1+y2)/(v+w+x+y)$ is 0.1 or more, where y1 denotes the number of moles of the at least some $(R^3)_3SiO_{1/2}$ moieties and y2 denotes the number of moles of the at least some other $(R^3)_3SiO_{1/2}$ moieties.

(3) At least some $(R^2)_2SiO_{2/2}$ moieties are such that one $R^2$ group is a hydrogen atom and the other $R^2$ group is an alkyl group having 1 to 10 carbon atoms, and at least some other $(R^2)_2SiO_{2/2}$ moieties are such that one $R^2$ group is an organic group having 2 to 10 carbon atoms and a carbon-carbon unsaturated bond that is able to be hydrosilylated and the other $R^2$ group is an alkyl group having 1 to 10 carbon atoms.

(4) The value of $(x1+x2)/(v+w+x+y)$ is 0.1 or more, where x1 denotes the number of moles of the at least some $(R^2)_2SiO_{2/2}$ moieties and x2 denotes the number of moles of the at least some other $(R^2)_2SiO_{2/2}$ moieties.

<Method for Producing Siloxane Compound>

The siloxane compound can be produced using a publicly known method. Methods for producing the siloxane compound are disclosed in detail as methods for producing polysiloxanes disclosed in the pamphlets of WO 2005/010077, WO 2009/066608 and WO 2013/099909, Japanese Patent Application Publication Nos. 2011-052170 and 2013-147659, and the like.

The siloxane compound can be produced using, for example, the following method. That is, the method for producing the siloxane compound can include a condensation step in which raw material monomers that give constituent units in formula (1) above are subjected to a hydrolysis/polycondensation reaction through condensation in an appropriate reaction solvent. A silicon compound having four siloxane bond-forming groups (hereinafter referred to as a "Q monomer") that forms constituent unit (1-1), a silicon compound having three siloxane bond-forming groups (hereinafter referred to as a "T monomer") that forms constituent unit (1-2), a silicon compound having two siloxane bond-forming groups (hereinafter referred to as a "D monomer") that forms constituent unit (1-3) and a silicon compound having one siloxane bond-forming group (hereinafter referred to as an "M monomer") that forms constituent unit (1-4) can be used in this condensation step.

More specifically, in the present description, among the Q monomer that forms constituent unit (1-1), the T monomer that forms constituent unit (1-2), the D monomer that forms constituent unit (1-3) and the M monomer that forms constituent unit (1-4), at least the T monomer and D monomer are used. After subjecting raw material monomers to a hydrolysis/polycondensation reaction in the presence of a reaction solvent, it is preferable to include a distillation step for distilling off the reaction solvent, by-products, residual monomers, water, and the like, in the reaction liquid.

Siloxane bond-forming groups contained in the Q monomer, T monomer, D monomer and M monomer that are raw material monomers are hydroxyl groups or hydrolyzable groups. Of these, halogeno groups and alkoxy groups can be given as examples of hydrolyzable groups. It is preferable for at least one of the Q monomer, T monomer, D monomer and M monomer to have a hydrolyzable group. In the condensation step, an alkoxy group is preferred as the hydrolyzable group, and an alkoxy group having 1 to 4 carbon atoms is more preferred, from the perspectives of exhibiting good hydrolysis properties and not causing an acid to be by-produced.

In the condensation step, it is preferable for siloxane bond-forming groups in the Q monomer, T monomer or D monomer that correspond to the respective constituent units to be alkoxy groups, and for a siloxane bond-forming group contained in the M monomer to be an alkoxy group or a siloxy group. In addition, a monomer that corresponds to a constituent unit may be a single monomer or a combination of two or more types thereof.

Examples of Q monomers that give constituent unit (1-1) include tetramethoxysilane, tetraethoxysilane, tetrapropoxysilane and tetrabutoxysilane. Examples of T monomers that give constituent unit (1-2) include trimethoxysilane, triethoxysilane, tripropoxysilane, methyltrimethoxysilane, methyltriethoxysilane, methyltripropoxysilane, methyltriisopropoxysilane, ethyltrimethoxysilane, ethyltriethoxysilane, propyltrimethoxysilane, propyltriethoxysilane, butyltrimethoxysilane, cyclohexyltrimethoxysilane, cyclohexyltriethoxysilane and trichlorosilane. Examples of T monomers that give constituent unit (1-2) include trimethoxyvinylsilane, triethoxyvinylsilane, vinyl-tris(2-methoxyethoxy)silane, trimethoxyallylsilane, triethoxyallylsilane, trimethoxy(7-octen-1-yl)silane, (p-styryl)trimethoxysilane, (p-styryl)triethoxysilane, (3-methacryloyloxypropyl)trimethoxysilane, (3-methacryloyloxypropyl)triethoxysilane, (3-acryloyloxypropyl)trimethoxysilane and (3-acryloyloxypropyl)triethoxysilane. Examples of D monomers that give constituent unit (1-3) include dimethoxydimethylsilane, dimethoxydiethylsilane, diethoxydimethylsilane, diethoxydiethylsilane, dipropoxydimethylsilane, dipropoxydiethylsilane, dimethoxybenzylmethylsilane, diethoxybenzylmethylsilane, dichlorodimethylsilane, dimethoxymethylsilane, dimethoxymethylvinylsilane, diethoxymethylsilane and diethoxymethylvinylsilane. Examples of M monomers that give constituent unit (1-4) include hexamethyldisiloxane, hexaethyldisiloxane, hexapropyldisiloxane, 1,1,3,3-tetramethyldisiloxane, 1,3-divinyl-1,1,3,3-tetramethyldisiloxane, methoxydimethylsilane, ethoxydimethylsilane, methoxydimethylvinylsilane and ethoxydimethylvinylsilane, which gave two constituent units (1-4) through hydrolysis, and methoxytrimethylsilane, ethoxytrimethylsilane, methoxydimethylphenylsilane, ethoxydimethylphenylsilane, chlorodimethylsilane, chlorodimethylvinylsilane, chlorotrimethylsilane, dimethylsilanol, dimethylvinylsilanol, trimethylsilanol, triethylsilanol, tripropylsilanol and tributylsilanol. Examples of organic compounds that give constituent unit (1-5) include alcohols such as 1-propanol, 2-propanol, 1-butanol, 2-methyl-1-propanol, 2-butanol, 2-methyl-2-propanol, methanol and ethanol. Also provided by the explanations given above are compositions containing such monomers in order to obtain the siloxane compound. Such compositions can be advantageously used in siloxane compounds used in water repellent oil repellent films.

An alcohol can be used as a reaction solvent in the condensation step. Strictly speaking, the alcohol is a compound which is represented by the general formula R—OH and does not contain functional groups other than an alcoholic hydroxyl group. Although not particularly limited, examples thereof include methanol, ethanol, n-propyl alcohol, isopropyl alcohol, 1-butanol, 2-butanol, isobutyl alcohol, 2-pentanol, 3-pentanol, 2-methyl-2-butanol, 3-methyl-2-butanol, cyclopentanol, 2-hexanol, 3-hexanol, 2-methyl-2-pentanol, 3-methyl-2-pentanol, 2-methyl-3-pentanol, 3-methyl-3-pentanol, 2-ethyl-2-butanol, 2,3-dimethyl-2-butanol and cyclohexanol. Of these, secondary alcohols such as isopropyl alcohol, 2-butanol, 2-pentanol, 3-pentanol, 3-methyl-2-butanol, cyclopentanol, 2-hexanol, 3-hexanol, 3-methyl-2-pentanol and cyclohexanol can be used. In the condensation step, it is possible to use one of these alcohols or a combination of two or more types thereof. More preferred alcohols are compounds that can dissolve a required concentration of water in the condensation step. Alcohols having such a property are compounds in which the solubility of water is 10 g or more per 100 g of alcohol at 20° C.

By using an alcohol in the condensation step at a quantity of 0.5 mass % or more relative to the total amount of reaction solvent, including additionally introduced components during the hydrolysis/polycondensation reaction, it is possible to suppress gelling of the siloxane compound being produced. A preferred usage amount is 1 mass % to 60 mass %, and more preferably 3 mass % to 40 mass %.

The reaction solvent used in the condensation step may be an alcohol in isolation, or a mixed solvent that further contains at least one type of secondary solvent. A secondary solvent may be a polar solvent, a non-polar solvent or a combination of both of these types. A preferred polar solvent is a secondary or tertiary alcohol having 3 or 7 to 10 carbon atoms, a diol having 2 to 20 carbon atoms, or the like. Moreover, in cases where a primary alcohol is used as a secondary solvent, the usage quantity thereof is preferably 5 mass % relative to the overall reaction solvent. A preferred polar solvent is 2-propanol, which can be inexpensively procured on an industrial scale, and by using a combination of 2-propanol and an alcohol selected from among a secondary alcohol having 4 to 6 carbon atoms and a tertiary alcohol having 4 to 6 carbon atoms, it is possible to dissolve a required amount of water together with the polar solvent and suppress the occurrence of gelling and the like even in cases where these alcohols cannot dissolve the required concentration of water in the hydrolysis step. A preferred polar solvent quantity is 20 parts by mass or less, more preferably 1 to 20 parts by mass, and particularly preferably 3 to 10 parts by mass, relative to 1 part by mass of an alcohol according to the present teaching.

The non-polar solvent is not particularly limited, but examples thereof include aliphatic hydrocarbons, alicyclic hydrocarbons, aromatic hydrocarbons, chlorinated hydrocarbons, alcohols, ethers, amides, ketones, esters and cellosolve solvents. Of these, aliphatic hydrocarbons, alicyclic hydrocarbons and aromatic hydrocarbons are preferred. Such non-polar solvents are not particularly limited, but, for example, n-hexane, isohexane, cyclohexane, heptane, toluene, xylene, methylene chloride, and the like, are preferred due to being azeotropic with water, and by additionally using these compounds, it is possible to efficiently distill off moisture and a polymerization catalyst such as an acid dissolved in water when removing the reaction solvent by distillation from the reaction mixture containing the siloxane compound after the condensation step. Xylene, which is an aromatic hydrocarbon, is particularly preferred as the non-polar solvent due to having a relatively high boiling point. The usage quantity of the non-polar solvent is 50 parts by mass or less, more preferably 1 to 30 parts by mass, and particularly preferably 5 to 20 parts by mass, relative to 1 part by mass of an alcohol according to the present teaching.

The hydrolysis/polycondensation reaction in the condensation step can progress in the presence of water. The amount of water used in order to hydrolyze hydrolyzable groups contained in the raw material monomers is preferably 0.5 to 5 times, and more preferably 1 to 2 times, the amount of hydrolyzable groups. In addition, hydrolysis/polycondensation reactions of raw material monomers may be carried out in the absence of a catalyst or by using a catalyst. An acid or an alkali can be used as a catalyst in the hydrolysis/polycondensation reaction. For example, an acid catalyst such as an inorganic acid, such as sulfuric acid, nitric acid, hydrochloric acid or phosphoric acid, or an organic acid, such as formic acid, acetic acid, oxalic acid or para-toluenesulfonic acid, can be advantageously used as said catalyst. The usage quantity of the acid catalyst is preferably an amount corresponding to 0.01 mol % to 20 mol %, and more preferably an amount corresponding to 0.1 mol % to 10 mol %, relative to the total amount of silicon atoms contained in the raw material monomers.

Completion of the hydrolysis/polycondensation reaction in the condensation step can be detected as appropriate using methods disclosed in the publications mentioned above. Moreover, it is possible to add auxiliary agents to the reaction system in the condensation step for producing the siloxane compound. Examples of auxiliary agents include anti-foaming agents for suppressing foaming of the reaction liquid, scale control agents for preventing scale from adhering to a reactor or stirring shaft, polymerization inhibitors and hydrosilylation reaction inhibitors. Usage quantities of these auxiliary agents are discretionary, but are preferably 1 mass % to 100 mass % relative to the concentration of the siloxane compound in the reaction mixture.

Following the condensation step in the production of the siloxane compound, by providing a distillation step for distilling off the reaction solvent, by-products, residual monomers, water, and the like, contained in the reaction liquid obtained in the condensation step, it is possible to improve the stability and usability of the thus produced siloxane compound. In particular, by using a solvent that is azeotropic with water as the reaction solvent and simultaneously distilling off this solvent, it is possible to efficiently remove an acid or base used as a polymerization catalyst. Moreover, it is possible to use appropriate depressurization conditions and a temperature of 100° C. or lower for the distillation, although this depends on the boiling point and the like of the solvents used.

(Water Repellent Oil Repellent Film Composition)

The water repellent oil repellent composition of the present teachings (hereinafter referred to as the composition) can contain the siloxane compound or a cured product of the siloxane compound.

The composition can employ a variety of embodiments. For example, the composition may be a composition prior to film formation which contains the siloxane compound and which is suitable for producing a water repellent oil repellent film (typically an amorphous-shaped body such as a liquid).

In addition, the composition may, for example, be a film-shaped composition which contains a cured product of the siloxane compound and which is formed on a surface of a workpiece. Moreover, details of a cured product of the composition and a method for curing the composition are explained in detail later.

In addition to containing only the siloxane compound or a cured product thereof, the composition may, if necessary, contain other film-forming components and cured products of these components. In addition to film-forming components, the composition may contain a solvent, a hydrosilylation catalyst used for curing the siloxane compound, a silicone oil, an antioxidant, and the like.

(Other Film-Forming Components: Linear Organopolysiloxanes and Branched Organopolysiloxanes)

In addition to the siloxane compound, the composition can contain a linear organopolysiloxane and/or a branched organopolysiloxane. For example, oily linear organopolysiloxanes, which are also known as so-called silicone oils, can be used as the linear organopolysiloxane. Branched organopolysiloxanes are, for example, silicone resins containing a T unit having a specific structure as an essential unit.

By blending the linear organopolysiloxane with the siloxane compound, it is possible to achieve superior water repellency and oil repellency. Despite being conjecture and not theoretically constraining the present teachings, it is thought that "blending" the linear organopolysiloxane lowers the surface free energy of a formed film of the composition, thereby improving water repellency and oil repellency.

It is thought that this type of advantageous effect is not caused by introducing the linear organopolysiloxane into the siloxane compound in advance, but by "blending" the siloxane compound and the linear organopolysiloxane and curing. That is, it is thought that this is because when the composition, which contains the siloxane compound and the linear organopolysiloxane, is cured, the linear organopolysiloxane tends to be near the outermost surface of the cured film. This is thought to be because the structures of the siloxane compound and the linear organopolysiloxane are similar but not identical, meaning that these components are not completely compatible and at least a part of the linear organopolysiloxane connects to the siloxane compound through bonding or the like at the time of curing. Conversely, by introducing the linear organopolysiloxane in advance when the siloxane compound is being synthesized, the linear organopolysiloxane structure is uniformly distributed throughout the cured film and tends not to be distributed at the outermost surface, and even if the linear organopolysiloxane is separately blended and a cured film is formed, compatibility between the siloxane compound and the linear organopolysiloxane is improved, meaning that distribution of the linear organopolysiloxane at the outermost surface is unlikely to occur.

Moreover, according to the inventors of the present teaching, the siloxane compound is thought to make an excellent contribution to the heat resistance, water repellency and oil repellency of a film. In addition, according to the inventors of the present teaching, the linear organopolysiloxane is thought to lower the surface free energy of a cured film, lower the coefficient of dynamic friction and impart the surface of the film with liquid slide-off properties, thereby contributing to water repellency and oil repellency. An improvement in liquid slide-off properties contributes to the ease of removal and recovery of adhered oils and moisture and also contributes to abrasion resistance of the film. Moreover, as described below, an improvement in liquid slide-off properties achieved by the linear organopolysiloxane also contributes to a synergistic effect with the branched organopolysiloxane.

In addition, according to the inventors of the present teaching, it was understood that the branched organopolysiloxane contributes to good film formation properties of the composition, suppresses cracking and abrasion during and after curing, and contributes to film strength characteristics such as excellent toughness. An improvement in film strength characteristics suppresses scratches and detachment of a coating film, and therefore contributes to an improvement in water repellency and oil repellency. Moreover, abrasion resistance of a film also contributes to a synergistic effect in terms of liquid slide-off properties achieved by the linear organopolysiloxane as well as the branched organopolysiloxane.

The composition achieves a synergistic effect by containing the linear organopolysiloxane and/or branched organopolysiloxane in addition to the siloxane compound. In addition, in said present composition, because the siloxane compound exhibits compatibility for the linear organopolysiloxane and the branched organopolysiloxane, it is possible to simultaneously incorporate the linear organopolysiloxane and the siloxane compound. Therefore, these components can be mixed when the composition is produced, and it is possible to obtain the composition with film-forming properties. Due to this configuration, a film obtained from the composition exhibits good characteristics of the siloxane compound, the linear organopolysiloxane and the branched organopolysiloxane.

In addition, liquid slide-off properties exhibited by the linear organopolysiloxane and film formation properties and abrasion resistance exhibited by the branched organopolysiloxane are combined, which contributes to good film strength characteristics at high temperatures and good water repellency and oil repellency together with the siloxane compound.

(Linear Organopolysiloxane)

The linear organopolysiloxane can have a linear organopolysiloxane residue represented by formula (2) below. The $R^5$ groups each independently denote a methyl group, an ethyl group, a propyl group, a cyclohexyl group or a phenyl group. Methyl groups and ethyl groups are preferred as the $R^5$ groups, and methyl groups are more preferred. Moreover, some of the methyl groups may be replaced by phenyl groups. Phenyl groups contribute to an improvement in heat resistance. m is, for example, an integer of 10 or more or an integer of 30 or more. In addition, m is an integer of 500 or less, and is, for example, an integer of 120 or less.

In addition, the weight average molecular weight in terms of polystyrene of the linear organopolysiloxane, as determined by gel permeation chromatography, is, for example, 1000 to 50,000 or 2000 to 30,000. If the molecular weight of the linear organopolysiloxane is low, the linear organopolysiloxane is readily compatible with a siloxane compound and film transparency is relatively high. Conversely, if the molecular weight of the linear organopolysiloxane is high, separation from a siloxane compound tends to occur and a film tends to become opaque, but the linear organopolysiloxane tends to be arranged at the surface and water repellency and oil repellency tend to be improved.

[C9]

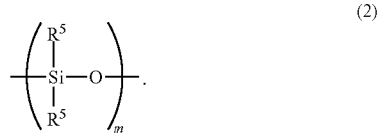

In addition to the D units in formula (2) above, the linear organopolysiloxane may contain D units that do not correspond to said D units and M units, but the amount of D units in formula (2) above is preferably 80% or more, more preferably 90% or more, further preferably 95% or more, particularly preferably 99% or more, and most preferably 100%, relative to all siloxane constituent units.

Terminal structures in the linear organopolysiloxane are not particularly limited, but can be hydrogen atoms, hydroxyl groups, alkyl groups having approximately 1 to 3 carbon atoms, alkoxy groups having 1 to 3 carbon atoms, unsaturated organic groups, and the like. These terminal structures are preferably hydrogen atoms, hydroxyl groups, alkoxy groups or unsaturated organic groups able to undergo crosslinking reactions with the siloxane compound. Even alkyl groups, which do not undergo crosslinking with the siloxane compound, have a useful function, but hydrogen atoms and unsaturated organic groups are crosslinked in hydrosilylation (addition) reactions, and hydroxyl groups and alkoxy groups are crosslinked by dehydration reactions and dealcoholization (condensation) reactions, which leads to expectations in terms of long-term heat-resistant anti-fouling properties. That is, it is preferable for one or both terminals of the linear organopolysiloxane to have a reactive group able to react with a hydrosilyl group or alkoxysilyl group, or the like, in the siloxane compound. The various types of unsaturated organic groups described above can be used. Moreover, it is sufficient for at least either one terminal or both terminals to have these reactive groups, but the presence of these reactive groups in side chains is not precluded.

The linear organopolysiloxane is represented by, for example, formula (3) below.

[C10]

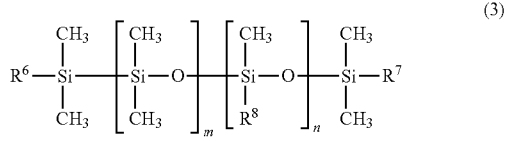

The linear organopolysiloxane is represented by formula (3), but $R^6$ and $R^7$ can each independently be hydrogen atoms, hydroxyl groups, alkyl groups having approximately 1 to 3 carbon atoms, alkoxy groups having 1 to 3 carbon atoms, unsaturated organic groups, and the like. These terminal structures are preferably hydrogen atoms, hydroxyl groups, alkoxy groups or unsaturated organic groups able to undergo crosslinking reactions with the siloxane compound. Even alkyl groups, which do not undergo crosslinking with component A, have a useful function, but hydrogen atoms and unsaturated organic groups are crosslinked in hydrosilylation (addition) reactions, and hydroxyl groups and alkoxy groups are crosslinked by dehydration reactions and dealcoholization (condensation) reactions, which leads to expectations in terms of long-term heat-resistant anti-fouling properties. That is, it is preferable for one or both terminals of the linear organopolysiloxane to have a reactive group able to react with a hydrosilyl group or alkoxysilyl group, or the like, in the siloxane compound. The various types of unsaturated organic groups described above can be used. Moreover, it is sufficient for at least either one terminal or both terminals to have these reactive groups, but the presence of these reactive groups in side chains is not precluded.

$R^8$ is at least one type selected from among an alkyl group having 1 to 20 carbon atoms, a phenyl group, a polyether group, an aralkyl group, a fluoroalkyl group, a fatty acid ester group and a fatty acid amide group, but is, for example, a methyl group. m is, for example, an integer of 10 or more or an integer of 30 or more. In addition, m is an integer of 500 or less, and is, for example, an integer of 120 or less.

The weight average molecular weight in terms of polystyrene of the linear organopolysiloxane, as determined by gel permeation chromatography, is, for example, 1000 to 50,000 or 2000 to 30,000. If the molecular weight of the linear organopolysiloxane is low, the linear organopolysiloxane is readily compatible with a siloxane compound and film transparency is relatively high. Conversely, if the molecular weight of the linear organopolysiloxane is high, separation from a siloxane compound tends to occur and a film tends to become opaque, but the linear organopolysiloxane tends to be arranged at the surface and water repellency and oil repellency tend to be improved.

The linear organopolysiloxane used in the composition can be selected, as appropriate, in view of compatibility with the branched organopolysiloxane mentioned below, the liquid slide-off properties to be exhibited by the linear organopolysiloxane, and the water repellency and oil repellency at high temperature of the composition.

This type of linear organopolysiloxane can be synthesized using a publicly known method using an alkoxy compound or halogenyl silane compound selected so as to achieve the described structure.

Examples of the linear organopolysiloxane include dimethylpolysiloxanes having weight average molecular weights of 1000 to 50,000 and modified at both terminals with silanol groups, and dimethylpolysiloxanes having weight average molecular weights of 1000 to 50,000 and modified at both terminals with vinyl groups. Examples of such linear organopolysiloxanes include XC96-723, YF3800, XF3905 and XF40-AI987 (which are produced by Momentive Performance Materials Inc.); KF-9701 and X-21-5841 (which are produced by Shin-Etsu Chemical Co., Ltd.); and DMS-S14, DMS-S15, DMS-S21, DMS-S27, DMS-S31, DMS-S32, DMS-S33, DMS-V21, DMS-V22, DMS-V25, DMS-V31, DMS-V33 and DMS-V35 (which are produced by Gelest, Inc.).

In the composition, the linear organopolysiloxane can be blended at a quantity of, for example, approximately 5 to 30 parts by mass relative to 100 parts by mass of the siloxane compound. In addition, the linear organopolysiloxane can be used at a quantity of, for example, 5 parts by mass or more and 25 parts by mass or less, or 10 parts by mass or more and 25 parts by mass or less.

In addition, in cases where the composition contains the linear organopolysiloxane and the branched organopolysiloxane, the linear organopolysiloxane can be contained in the composition at a discretionary quantity relative to the total mass of the siloxane compound and the branched organopolysiloxane described later. For example, this discretionary quantity is 0.1 mass % or more and 50 mass % or less. If this quantity is less than 0.1 mass %, the advantageous effect of an auxiliary anti-fouling agent or additive for liquid slide-off properties is difficult to achieve, and if this quantity exceeds 50 mass %, the proportion of the linear organopolysiloxane, which is less likely to form a film, becomes too high relative to the siloxane compound and branched organopolysiloxane, which have relatively high film-forming properties, meaning that coating film formation is inadequate and heat-resistant anti-fouling properties and abrasion resistance tend to deteriorate. In addition, this quantity is, for example, 1 mass % or more and 40 mass % or less, or 10 mass % or more and 30 mass % or less.

(Branched Organopolysiloxane)

The composition may further contain the branched organopolysiloxane. The branched organopolysiloxane is represented by, for example, formula (4). Branched organopolysiloxanes are also known as, for example, silicone resins.

[C11]

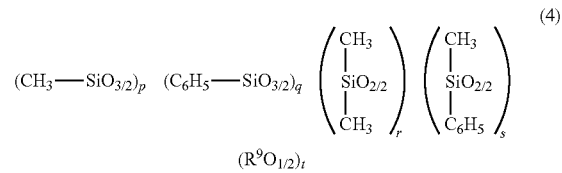

(4)

The branched organopolysiloxane is represented by formula (4), but $R^9$ groups are hydrogen atoms or alkyl groups having 1 to 6 carbon atoms, and may be the same as, or different from, each other. $R^9$ groups preferably include hydrogen atoms. In such cases, component C is a dehydrating condensation type compound, and can be cured by, for example, bringing about a dehydrating condensation reaction by heating at 150° C. or higher without the need for a hydrosilylation reaction catalyst.

$R^9$ groups can typically be alkyl groups having 1 to 4 carbon atoms. The alkyl groups may be straight chain alkyl groups or branched alkyl groups. Examples of $R^9$ groups include methyl groups, ethyl groups, n-propyl groups, isopropyl groups, n-butyl groups, sec-butyl groups and tert-butyl groups.

p and q in formula (4) can be such that p>0 and q>0. That is, T units can be essential components in component C. This can contribute to film hardness and toughness. In addition, p and q can be such that p>0 and q>0 simultaneously. This can significantly contribute to film hardness and toughness. In addition, r and s in formula (4) can be such that r≥0 and s≥0. In addition, r and s can be such that r≥0 and s≥0 simultaneously. That is, D units in component C can be optional components, and even if component C is only T units, it is possible to exhibit film strength characteristics.

In addition, formula (4) can be such that p+2r+s>q+s. That is, the total number of methyl groups in T units and D units in component C can be greater than the total number of phenyl groups in T units and D units. By constituting component C in this way, it is possible to achieve good film strength and toughness.

The weight average molecular weight of the branched organopolysiloxane can be, for example, 2000 or more. This is because if the weight average molecular weight is too low, the crosslinking density is too great, which can cause cracking and detachment. In addition, the weight average molecular weight is, for example, 3000 or more. Meanwhile, the upper limit of the weight average molecular weight of the branched organopolysiloxane in the composition should be such that it is possible to appropriately investigate, where necessary, film characteristics to be achieved and determine application possibilities. Although not particularly limited, the weight average molecular weight is for example, 2,000, 000 or less, 1,000,000 or less, 500,000 or less, 20,000 or less, 10,000 or less, or 8000 or less. Moreover, the weight average molecular weight can be determined as the weight average molecular weight in terms of polystyrene using gel permeation chromatography.

In cases where the composition contains the linear organopolysiloxane and the branched organopolysiloxane, the branched organopolysiloxane can be contained in the composition at a discretionary quantity relative to the total mass of the siloxane compound and the linear organopolysiloxane. For example, this discretionary quantity is 5 mass % or more and 95 mass % or less. This is because abrasion resistance tends to decrease if this quantity is less than 5 mass % and heat-resistant anti-fouling properties tend to decrease is this quantity exceeds 95 mass %. In addition, this quantity is, for example, 10 mass % or more and 90 mass % or less, 10 mass % or more and 80 mass % or less, or 10 mass % or more and 70 mass % or less.

The branched organopolysiloxane can be synthesized using a publicly known method using an alkoxy compound or halogenyl silane compound selected so as to achieve the described structure, such as the method described above for producing the siloxane compound.

An organopolysiloxane having methyl groups and phenyl groups can be given as an example of the branched organopolysiloxane. Examples of component C include KR112, KR211, KR212, KR255, KR271, KR272, KR282, KR300 and KR311 (these are produced by Shin-Etsu Chemical Co., Ltd.) and RSN0249, 220FLAKE, 233FLAKE, 249FLAKE, 804RESIN, 805RESIN, 806RESIN and 840RESIN (these are produced by Dow Toray Co. Ltd.).

Moreover, in cases where the composition contains a polymerization catalyst used when synthesizing the siloxane compound, it is preferable for the composition to contain substantially no polymerization catalyst. If the composition contains a polymerization catalyst, there are concerns regarding corrosion of facilities and equipment used for coating and the like depending on the liquid properties of the composition (acidity or alkalinity), and there are also concerns regarding a reduction in safety in working environments. Following hydrolysis/polycondensation carried out in order to obtain the siloxane compound, a polymerization catalyst may be reduced to a level at which it can be said that the polymerization catalyst is substantially not contained by distilling off water and volatile solvents. For example, in the composition, the amount of polymerization catalyst is, for example, 0.1 mass % or less, 0.05 mass % or less, 0.01 mass % or less, or 0.005 mass % or less. Moreover, quantitative determination of the polymerization catalyst can be carried out using, for example, Cl-ion chromatography.

(Solvent)

The composition can, if necessary, be diluted with a solvent and then used for film formation. The solvent is preferably a solvent capable of dissolving the siloxane compound, and in cases where the composition contains the linear organopolysiloxane and/or the branched organopolysiloxane, the solvent is preferably a solvent capable of dissolving these additional components, and examples of the solvent include organic solvents such as aliphatic hydrocarbon solvents, aromatic hydrocarbon solvents, chlorinated hydrocarbon solvents, alcohol solvents, ether solvents, amide solvents, ketone solvents, ester solvents and cellosolve solvents. Moreover, solvents other than alcohols are preferred in order to avoid decomposition of Si—H groups in the presence of a hydrosilylation catalyst such as Pt.

(Hydrosilylation Catalyst)

The composition can contain a hydrosilylation catalyst. The hydrosilylation catalyst can facilitate a hydrosilylation reaction of the siloxane compound. Examples of hydrosilylation catalysts include group 8 to group 10 metals, such as cobalt, nickel, ruthenium, rhodium, palladium, iridium and platinum, and organometallic complexes, metal salts, metal oxides, and the like, of these metals. A platinum-based catalyst is generally used. Examples of platinum-based catalysts include cis-$PtCl_2(PhCN)_2$, platinum-carbon, a platinum complex in which 1,3-divinyltetramethyldisiloxane is coordinated (Pt(dvs)), a platinum vinylmethyl cyclic siloxane complex, a platinum carbonyl-vinylmethyl cyclic siloxane complex, diplatinum tris(dibenzylideneacetone), chloroplatinic acid, bis(ethylene)tetrachlorodiplatinum, cyclooctadienedichloroplatinum, bis(cyclooctadiene) platinum, bis(dimethylphenylphosphine)dichloroplatinum and tetrakis(triphenylphosphine)platinum. Of these, a platinum complex in which 1,3-divinyltetramethyldisiloxane is coordinated (Pt(dvs)), a platinum vinylmethyl cyclic siloxane complex or a platinum carbonyl-vinylmethyl cyclic siloxane complex is particularly preferred. Moreover, Ph denotes a phenyl group. The usage quantity of the catalyst is preferably 0.1 ppm by mass or more and 1000 ppm by mass or less, more preferably 0.5 to 100 ppm by mass, and further preferably 1 to 50 ppm by mass, relative to the amount of the siloxane compound.

In cases where the composition contains a hydrosilylation reaction catalyst, a hydrosilylation reaction may preferentially occur instead of a dehydration polycondensation reaction of residual alkoxy groups or hydroxyl groups in constituent unit (1-5), and the composition may contain a hydrosilylation structural moiety and the alkoxy groups or hydroxyl groups may undergo a further crosslinking reaction.

In cases where the composition contains a hydrosilylation catalyst, a hydrosilylation reaction inhibitor may be added in order to suppress gelling of the siloxane compound and improve storage stability. Examples of hydrosilylation reaction inhibitors include methylvinylcyclotetrasiloxane, acetylene alcohol compounds, siloxane-modified acetylene alcohol compounds, hydroperoxides and inhibitors containing nitrogen atoms, sulfur atoms or phosphorus atoms.

Even if the composition is a composition used for forming a film, the composition may contain substantially no hydrosilylation catalyst. As mentioned later, the siloxane compound can be cured by facilitating a hydrosilylation reaction by a heat treatment even if a hydrosilylation catalyst is not present. In addition, this is because in cases where a film is formed without a hydrosilylation catalyst being contained, the water repellency and oil repellency of the film may be improved. The composition containing substantially no hydrosilylation catalyst means not only cases where a hydrosilylation catalyst is intentionally not added, but also cases where the content of a hydrosilylation catalyst is, for example, less than 0.1 ppm by mass or 0.05 ppm by mass or less relative to the amount of the siloxane compound.

(Other Components)

A variety of additives may also be added to the composition when the composition is cured. Examples of additives include reactive diluents such as tetraalkoxysilanes and trialkoxysilane compounds (trialkoxysilanes, trialkoxyvinylsilanes and the like). These additives are used at quantities whereby the heat resistance of an obtained cured product of the siloxane compound is not impaired.

<Method for Producing Film Using the Composition>

A film having excellent water repellency and oil repellency can be formed by supplying the composition to a surface of a workpiece having an arbitrary shape and then curing the composition. For example, it is possible to supply the composition to a surface at a location requiring water repellency and oil repellency and then curing the composition. Because the siloxane compound is a liquid substance having a viscosity at 25° C. of 30,000 mPa·s or less, it is possible to maintain the composition in a similar liquid state and it is also possible for the surface of the workpiece to remain coated at the time of curing.

The composition can be supplied to a surface of a workpiece using an ordinary coating method such as a spray coating method, a casting method, a spin coating method or a bar coating method.

A cured product of the siloxane compound having an additional crosslinked structure can be obtained by subjecting the composition to formation of a crosslinked structure by a polycondensation reaction of residual alkoxy groups and/or hydroxyl groups in the siloxane compound (primary curing) and/or formation of a crosslinked structure by a hydrosilylation reaction between a hydrosilyl group and an unsaturated organic group (secondary curing). A cured product of the composition that contains the siloxane compound is generally a cured product comprising only primary curing or a cured product including both primary curing and secondary curing, but a typical cured product is characterized by the presence or absence of a crosslinked structure obtained by secondary curing.

In cases where the composition contains the linear organopolysiloxane and this organopolysiloxane has a terminal hydroxyl group, polycondensation of this organopolysiloxane and/or polycondensation of this organopolysiloxane and the siloxane compound progress as curing of the siloxane compound progresses, and this contributes to formation of a cured product of the composition. In cases where the composition contains the branched organopolysiloxane, a crosslinked structure is formed (primary curing) by polycondensation of residual alkoxy groups and/or hydroxyl groups in this organopolysiloxane and polycondensation between this organopolysiloxane and the siloxane compound as curing of the siloxane compound progresses, and this contributes to formation of a cured product of the composition.

<Method for Curing the Composition; Curing Method Comprising Mainly Primary Curing>

In order to obtain a primary cured product by facilitating polycondensation of the siloxane compound and, in some cases, unreacted alkoxy groups and silanol groups in the linear organopolysiloxane and/or branched organopolysiloxane (hereinafter referred to as the siloxane compound and the like) in the composition, it is possible to, for example, heat the siloxane compound to a temperature of 50° C. or higher and 200° C. or lower in the absence of a hydrosilylation catalyst. In addition, the siloxane compound may be heated to a temperature of, for example, 100° C. or higher and 150° C. or lower in the absence of a hydrosilylation catalyst. Within the temperature range of 50° C. or higher and 200° C. or lower, the curing temperature may be fixed, but may also be increased and/or decreased. At a temperature of 50° C. or higher and 200° C. or lower, a crosslinked structure can be formed mainly by a reaction of alkoxysilyl groups (hydrolysis/polycondensation). Under these heating conditions, a crosslinked structure may be partially formed by a hydrosilylation reaction even if a hydrosilylation catalyst is not present.

In cases where primary curing is carried out at a temperature of 50° C. or higher and 200° C. or lower, the curing time in a first stage is generally 0.1 to 10 hours, and preferably 0.5 to 5 hours.

<Method for Curing the Composition; Curing Method Comprising Mainly Secondary Curing>

A secondary cured product of the present teaching can be obtained by, for example, reacting the composition in the presence of a hydrosilylation catalyst at a relatively low temperature (for example, room temperature or higher and 200° C. or lower, and preferably 50° C. or higher and 150° C. or lower). In this case, because a hydrosilylation reaction is more facilitated than a polycondensation reaction of the siloxane compound and the like, primary curing also progresses, but alkoxy groups and the like tend to remain. In cases where a hydrosilylation catalyst is used, the curing time is generally 0.05 to 24 hours, and preferably 0.1 to 5 hours.

In addition, a secondary cured product of the composition can be obtained by, for example, heating the composition in the absence of a hydrosilylation catalyst at a temperature of, for example, higher than 200° C. but not higher than 400° C. either after primary curing at 200° C. or lower or without carrying out the primary curing. By carrying out secondary curing under such conditions, it is possible to achieve excellent water repellency and oil repellency at high temperatures even at a film thickness of, for example, 0.1 μm or larger and 1 μm or smaller after curing. In addition, if the temperature is 400° C. or lower, unreacted hydrosilyl groups tend to remain, but excellent water repellency and liquid repellency at high temperatures may be achieved. The heating temperature is, for example, 350° C. or lower or 300° C. or lower. Moreover, carrying out secondary curing at a temperature in excess of 400° C. is not precluded, and secondary curing can be carried out at a temperature of, for example, 600° C. or lower or 500° C. or lower.

In cases where secondary curing is facilitated by heating in the absence of a hydrosilylation catalyst, the heating temperature may be gradually increased in a plurality of stages. In addition, the heating time at each temperature is, for example, 0.1 to 2 hours, 0.1 to 1 hour or 0.2 to 0.5 hours. Typically, it is possible to heat for 10 minutes at 200° C., increase the temperature, and then heat for 10 minutes at 350° C. Moreover, when increasing the heating temperature, the temperature can be increased at a rate of, for example, approximately 5 to 10° C./min.

Moreover, regardless of the presence or absence of a catalyst, curing of the composition that includes primary curing and secondary curing of the siloxane compound and the like may be carried out in air or in an inert gas atmosphere such as nitrogen gas, and may be carried out under reduced pressure. However, in order to facilitate a reaction of alkoxysilyl groups present in the siloxane compound and the like, it is preferable for the curing to take place in an atmosphere containing an amount of water at which alkoxysilyl groups can be hydrolyzed. If the curing is carried out in air, hydrolysis of alkoxysilyl groups is facilitated by moisture contained in the air, and because hydrosilyl groups are oxidized by oxygen to form hydroxysilyl groups, curing can be sufficiently facilitated. Meanwhile, if the curing is carried out in an inert gas atmosphere or under reduced pressure, there is unlikely to be an adverse effect such as a change in volume caused by oxidation, and it is therefore possible to obtain a cured product having few cracks. A method comprising carrying out primary curing in air and carrying out secondary curing in air, in an inert gas atmosphere such as nitrogen gas or under reduced pressure is preferred as another method for producing a cured product of the composition.

Moreover, the composition may contain a solvent, as mentioned above. In cases where the composition contains a solvent, it is preferable to remove the solvent before curing. The solvent may be removed in air or an inert gas atmosphere, or under reduced pressure. Heating may be carried out in order to remove the solvent, but in such cases, the heating temperature is preferably lower than 200° C., and more preferably 50° C. or higher and 150° C. or lower. The time required for distilling off the solvent is not particularly limited, but can be, for example, approximately 0.1 to 0.5 hours. Moreover, distilling off such solvents may occur during primary curing or secondary curing.

The composition may be formed as a film-shaped body on a surface of a workpiece using the film production method described above. A cured product of the composition contains, for example, a cured product of the siloxane compound. Examples of cured products of the siloxane compound include cured products obtained by forming sufficient siloxane bonds by dehydration/polycondensation of unreacted alkoxy groups in the siloxane compound, that is, alkoxy groups or hydroxyl groups in $R^4$ groups in constituent unit (1-5), and then curing by facilitating crosslinking (curing through polycondensation of such residual alkoxy groups and the like is also referred to as primary curing). Such cured products (hereinafter also referred to as primary cured products) may encompass the siloxane compound represented by compositional formula (1).

In addition, examples of other cured products of the siloxane compound include cured products obtained by bringing about a hydrosilylation reaction between hydrogen atoms and unsaturated organic groups in constituent units (1-2) to (1-3) so as to effect curing by facilitating crosslinking (this type of curing is also referred to as secondary curing). Such cured products (hereinafter also referred to as secondary cured products) can include derivatives of the siloxane compound having structural moieties (—Si—C—C—$R_m$—Si—, —Si—C=C—$R_m$—Si—) (also referred to as hydrosilylation structural moieties; R is an organic group having 1 to 8 carbon atoms, and m is an integer of 0 or 1) containing carbon-carbon bonds (single bonds or double bonds) derived from unsaturated organic groups formed by at least some hydrosilylable functional groups (hydrosilyl groups and unsaturated organic groups) in these constituent units in the siloxane compound undergoing hydrosilylation reactions. Examples thereof include —Si—C—C—Si— and —Si—C=C—Si— moieties.

For example, in cases where the composition contains the linear organopolysiloxane in addition to the siloxane compound, the cured product can contain cured products obtained by polycondensation of the linear organopolysiloxane and cured products obtained by polycondensation of the siloxane compound and the linear organopolysiloxane in addition to the above-mentioned cured product of the siloxane compound.

For example, in cases where the composition contains the branched organopolysiloxane in addition to the siloxane compound, the cured product can contain cured products obtained by polycondensation of hydroxyl groups or alkoxy groups in the branched organopolysiloxane and cured products obtained by polycondensation of the siloxane compound and the branched organopolysiloxane in addition to the above-mentioned cured product of the siloxane compound.

In the case of an embodiment in which the composition is formed as a film, the composition is generally a secondary cured product of the siloxane compound. Hydrosilylation structural moieties can contribute to a practical degree of film strength and film performance.

In cases where the composition is a film-shaped body, the film thickness is not particularly limited, but can be, for example, 0.05 μm to 10 μm. For example, the film thickness is 0.1 μm or larger and 3 μm or smaller, 0.2 μm or larger and 2 μm or smaller, or 0.2 μm or larger and 1.5 μm or smaller.

Primary curing of the siloxane compound may occur during secondary curing, and secondary curing may occur during primary curing, and secondary curing does occur during primary curing in many cases. Therefore, a cured product of the siloxane compound is generally a secondary cured product, and secondary curing occurs during primary curing in many cases. A typical cured product is characterized by the presence or absence of a crosslinked structure obtained through secondary curing. Compositions and structures of cured products can be specified by, for example, detection of regularity (irregularity) of constituent units and structures, such as Q units, T units, D units, M units and alkoxy groups, by $^1$H NMR and $^{29}$Si NMR and detection of characteristic groups by IR spectroscopy.

For example, the heat resistance of the composition containing a secondary cured product of the siloxane compound can be evaluated using a differential thermal and thermogravimetric analysis apparatus (TG/DTA) or the like. A cured product of the composition, which is obtained by curing the composition without using a hydrosilylation reaction catalyst, can have a weight loss of approximately 5% at 1000° C., and exhibits high heat resistance. In addition, even if a hydrosilylation reaction catalyst is used, it is possible to make the weight loss of a cured product approximately 10% at 1000° C. and exhibit high heat resistance by adjusting the amount of catalyst, or the like.

For example, the water repellency and oil repellency of the composition containing a secondary cured product of the siloxane compound can be evaluated using a contact angle gauge. For example, it is possible to add 4 μm droplets of water or oleic acid to a surface of a coating film of the composition using a contact angle gauge having a dynamic imaging function, and then evaluate water repellency and oil repellency on the basis of the contact angle of the droplets after 10 seconds. Moreover, a coating film is formed by obtaining an enamel, stainless steel or glass test piece having a flat surface having an area of 5 cm×5 cm to 15 cm×15 cm (typically 1 cm×5 cm) and then forming a coating film having a thickness of 1 μm on this flat surface. Contact angles are measured at five different locations distributed approximately evenly on the coating film, and the average value at three locations, excluding the locations having the maximum value and minimum value, is taken to be an evaluation value. For the composition, the contact angle of an oleic acid droplet after being left for, for example, 24 hours at 400° C., is 400 or more and is, for example, 450 or more or 500 or more.

(Heat-Resistant Anti-Fouling Method)

A heat-resistant anti-fouling method disclosed in the present description can include a step for coating the composition on a surface of a substrate and heating the composition so as to form a cured product. According to the method, it is possible to form a coating film which exhibits excellent water repellency and oil repellency at high temperatures as well as imparting the surface of the substrate with heat resistance. The method can be carried out as a method for producing an apparatus having a heating chamber, which is described later, or a repair method for maintaining or improving anti-fouling properties in such an apparatus or the like.

The material of the substrate is not particularly limited, but examples thereof include metal-based materials such as stainless steel, ceramic materials and glass materials such as enamel. The substrate that is a workpiece is not particularly limited, but examples thereof include elements of apparatuses having heating chambers, such as the cooking apparatus described later, and structures exposed to heat in factory equipment. Examples of methods for applying the composition to a surface of a substrate include the spray coating method mentioned above. In addition, when curing the siloxane compound in the composition, it is possible to use conditions described above in view of a given application, but it is preferable to use a method in which secondary curing is intentionally carried out.

<Apparatus Having Heating Chamber, and Method for Producing Same>

An apparatus disclosed in the present description (hereinafter also referred to simply as the apparatus) can be provided with a heating chamber and the composition in a film-shaped form, which is provided on a surface of an element that is exposed to heat, which is at least a part of the heating chamber. According to the apparatus, it is possible to provide the composition as a film-shaped body on the element of the heating chamber, and it is therefore possible to impart anti-fouling properties by imparting the element with water repellency and oil repellency. Because the composition exhibits excellent water repellency and oil repellency at high temperatures, anti-fouling properties are ensured on an element such as an internal wall even in cases where the temperature inside the heating chamber is a high-temperature of approximately 300° C., and stains such as oils or the like derived from an object being heated are unlikely to adhere, and can be easily removed.

Examples of the apparatus include a variety of cooking apparatuses having electric or gas heating chambers, such as ovens used in kitchens and the like and grills attached to gas cookers and the like. Other examples include heating apparatuses in industrial applications that primarily use industrial equipment and the like. Moreover, the heating chamber may be a tunnel type oven or the like in an industrial application. In such apparatuses, the composition is provided as a film-shaped body on an element that is exposed to heat, such as an internal wall. It is highly likely that gases, liquids and solids generated from objects being heated will adhere to internal walls as heating is carried out. In addition to internal walls of heating chambers, examples of elements exposed to heat include other elements on which substances generated from objects being heated may adhere as heating is carried out. Examples thereof include the bottom of a heating chamber, an internal wall of an opening/closing part of a heating chamber, and a member for holding or retaining an object to be heated, such as a baking tray or mesh in a heating chamber. This element is not particularly limited, but is constituted from, for example, a metal-based material such as stainless steel, a ceramic material, a glass material such as enamel, or the like.

The composition is provided as a film-shaped body having a thickness such as that mentioned above on a surface of an element of this type of heating chamber. The composition preferably includes a cured product obtained by secondary curing and having a hydrosilylation structural moiety. In addition, the composition is preferably a cured product obtained by secondary curing in the absence of a hydrosilylation catalyst. Furthermore, the composition preferably contains the linear organopolysiloxane.

The apparatus may be produced by a method in which the composition is supplied to a surface of an element such as an internal wall in a step for producing the apparatus or a production step that is separate from a step for producing the apparatus, and the composition is then cured so as to form a water repellent oil repellent film of the composition on the surface of the element. Although not particularly limited, the composition can be supplied to the element using an ordinary coating method such as a spray coating method, a casting method, a spin coating method or a bar coating method. In addition, when curing the siloxane compound in the composition, it is possible to use conditions described above, but it is preferable to use a method in which secondary curing is intentionally carried out.

<Structure and Method for Producing Same>

The present description also provides a structure in which the composition is provided on a surface of an element that is exposed to heat. This structure may be a facility such as a factory, or a part thereof, or a building element that constitutes a factory. According to this structure, it is possible to impart anti-fouling properties by imparting water repellency and oil repellency, in the same way as described with respect to the heating chamber mentioned above. Examples of such structures include industrial equipment, construction equipment, ducts for exhaust gases and the like and scrubbers, and examples of materials of these structures are the same as those described with respect to the element of the heating chamber mentioned above.

A variety of embodiments relating to the composition on a surface of an element exposed to heat in the heating chamber mentioned above can be used as embodiments relating to such a structure, such as the film thickness of the composition on the surface of the structure, the type of curing and the method for forming a film of the composition.

EMBODIMENTS

This teaching will now be explained in further detail through the use of embodiments. However, the present teaching is in no way limited to these embodiments. Moreover, "Mn" and "Mw" denote number average molecular weight and weight average molecular weight respectively, and molecular weights are calculated using standard polystyrene from retention time when separation is carried out using gel permeation chromatography (hereinafter abbreviated to "GPC") using connected GPC columns ("TSK gel G4000HX" and "TSK gel G2000HX" (model names, produced by Tosoh Corporation)) at 40° C. in a toluene solvent. In addition, for $^1$H-NMR analysis of an obtained siloxane compound, a sample was dissolved in deuterated chloroform and then measured and analyzed. Furthermore, the viscosity of an obtained siloxane compound was measured at 25° C. using an E-type viscometer.

First Embodiment (Synthesis of Polysiloxane (Siloxane Compound) P1)

A four-mouthed flask was fitted with a magnetic stirrer, a dropping funnel, a reflux condenser and a temperature gauge, and the inside of the flask was filled with a nitrogen gas atmosphere. Next, a magnetic stirrer, 142.64 g (0.8 mol) of methyltriethoxysilane, 96.18 g (0.8 mol) of dimethoxydimethylsilane, 13.43 g (0.1 mol) of 1,1,3,3-tetramethyldisiloxane, 18.64 g (0.1 mol) of 1,3-divinyl-1,1,3,3-tetramethyldisiloxane, 138.11 g of 2-butanol and 414.33 g of xylene were placed in this flask, a mixed liquid of 74.86 g of an aqueous hydrochloric acid solution having a concentration of 3.74 mass % and 69.06 g of 2-butanol was then added dropwise over a period of 1 hour from the dropping funnel while stirring the contents of the flask at 25° C., and a hydrolysis/polycondensation reaction was carried out. Following completion of the dropwise addition, the reaction liquid was left to rest at 25° C. for 18 hours. Next, volatile components such as water were distilled off from the reaction liquid under reduced pressure (temperature: 11° C. to 60° C., pressure: 52 to 1 mmHg), and 142.2 g of a colorless liquid (hereinafter referred to as "polysiloxane (P1)") was obtained. This polysiloxane (P1) was subjected to GPC measurements and found to have a number average molecular weight (Mn) of 580 and a weight average molecular weight (Mw) of 830. In addition, the viscosity at 25° C. was measured using an E-type viscometer and found to be 11 mPa·s. $^1$H-NMR analysis results showed that most of the raw materials had quantitatively reacted, but the constituent proportion of M units derived from 1,1,3,3-tetramethyldisiloxane (hereinafter abbreviated to TMDSO) was 84% of the theoretical value corresponding to the charged amount thereof, the content of alkoxy groups ($R^9O_{1/2}$) was 8.0 wt %, and the molar ratio of alkoxy groups relative to the total amount of Si was 0.064.

Table 1 shows the molar ratios of raw materials used in the synthesis of polysiloxane P1 and the molar ratios of Si, hydrosilylable H and vinyl groups in unsaturated organic groups contained in the raw materials used. In addition, Table 2 shows molar quantities based on charged amounts and molar quantities based on 1H-NMR analysis results for the amounts of Si and Si—H groups derived from raw materials, the amount of Si—H groups derived from triethoxysilane, the Si—H group/Si ratio (molar ratio), the Si—H group derived from triethoxysilane/Si ratio (molar ratio), the amount of vinyl groups, the D structure/Si ratio, that is, x/(v+w+x+y) (molar ratio), the D structure/T structure ratio, that is, x/w (molar ratio), the Si—C—C—Si/Si ratio (molar ratio), the (X1+X2)/(v+w+x+y) ratio, the (y1+y2)/(v+w+x+y) ratio, the w/(v+w+x+y) ratio and the y/(v+w+x+y) ratio in the synthesized polysiloxane P1.

(Synthesis of Siloxane Compounds P2 to P4)

In accordance with the compositions shown in Table 1 below, polysiloxanes (P2 to P4) were obtained in the same way as polysiloxane P1, except that raw materials were used at quantities that were 1/10th of the molar ratios shown for the raw materials shown in Table 1, and isopropyl alcohol was used as a solvent. Molar quantities and the like in these polysiloxanes are shown in Table 2. In addition, these polysiloxanes were subjected to GPC measurements and found to have number average molecular weights (Mn) of 1250, 1110 and 1440 and weight average molecular weights (Mw) of 2960, 1290 and 1990. In addition, the viscosity values at 25° C. of these polysiloxanes were measured using an E-type viscometer and found to be 37, 14 and 43 mPa·s.

1H-NMR analysis results showed that most of the raw materials had quantitatively reacted, but the constituent proportions of M units derived from TMDSO were 82%, 87% and 84%, respectively, of the theoretical value corresponding to the charged amount thereof, the content values of alkoxy groups were 0.03 wt %, 0.9 wt % and 0.9 wt %, respectively, and the molar ratios of alkoxy groups relative to the total amount of Si were 0.018, 0.010 and 0.010, respectively. Table 2 shows constituent proportions of Si—H groups and the like for P2 to P4, in the same way as for P1.

In accordance with the compositions shown in Table 1 below, polysiloxanes P5 to P8 of Comparative Examples (Comparative Examples 1 to 4) were obtained in the same way as polysiloxane P1, except that raw materials were used at quantities that were 1/10th of the molar quantities shown for the raw materials shown in Table 1, and isopropyl alcohol was used as a solvent for P6 to P8. Along with general descriptions, Table 1 shows the charging ratio of the linear organopolysiloxane (a silicone oil) used in order to introduce the linear organopolysiloxane, which is a pre-polymerized D unit, as a constituent component of the polysiloxane. These obtained polysiloxanes (P5 to P8) were subjected to GPC measurements and found to have number average molecular weights (Mn) of 1600, 1600, 1400 and 800, respectively, and weight average molecular weights (Mw) of 3200, 3700, 3970 and 1530, respectively. In addition, the viscosity values of these polysiloxanes at 25° C. were measured using an E-type viscometer and found to be 280, 120, 45 and 58 mPa·s, respectively.

1H-NMR analysis results showed that most of the raw materials had quantitatively reacted, but the constituent proportions of M units derived from TMDSO were 47%, 59%, 80% and 82%, respectively, of the theoretical value corresponding to the charged amount thereof, the content values of alkoxy groups were 2.8 wt %, 3.2 wt %, 0.2 wt % and 6.2 wt %, respectively, and the molar ratios of alkoxy groups relative to the total amount of Si were 0.036, 0.035, 0.050 and 0.071, respectively. Table 2 shows constituent proportions of Si—H groups and the like for P5 to P8, in the same way as for P1.

TABLE 1

| Basic Constituent Unit, etc Raw Materials | | T unit | | D unit | | | M unit | 1,3-Divinyl 1,1,3,3-tetramethyl-disiloxane | Linear Organo-polysiloxane | |
|---|---|---|---|---|---|---|---|---|---|---|
| | | Triethoxy-silane | Triethoxy-methyl-silane | Trimethoxy-vinyl-silane | Dimethoxy-dimethyl-silane | Dimethoxy-methyl-silane | Dimethoxy-methyl-vinylsilane | 1,1,3,3-Tetramethyl-disiloxane | | Silicone oil E | Silicone oil A |
| Charac-teristic groups derived from raw materials | Si | 1 | 1 | 1 | 1 | 1 | 1 | 2 | 2 | 1 | 1 |
| | H | 1 | 0 | 0 | 0 | 1 | 0 | 2 | 0 | 0 | 0 |
| | Vinyl | 0 | 0 | 1 | 0 | 0 | 1 | 0 | 2 | 0 | 0 |
| Example | P1 | | 8 | | 8 | | | 1 | | | |
| | P2 | | 8 | | 4 | 2 | 2 | 1 | 1 | | |
| | P3 | | 8 | | 8 | | | 1.5 | | | |
| | P4 | 2 | 8 | | 8 | | | 1 | 1 | | |
| Com-parative Example | P5 | 3 | | 1 | | | | 1 | | | |
| | P6 | 3 | | 1 | 0.5 | | | 1 | | | |
| | P7 | | 8 | | 4 | 2 | 2 | 1 | 1 | | 3.8 |
| | P8 | 2 | | 4 | | | | 1 | | 1 | |

Unit: mol
(1) Silicone oil A: Silicone oil silanol-modified at both terminals, Mn 1800, Mw 4000
(2) Silicone oil E: Silicone oil silanol-modified at both terminals, Mn 630, Mw 1460

TABLE 2

| Ratio based on the charged amount | | Si | Si-H group | Si-H (Derived from Triethoxy-silane) | Si-H (Derived from Triethoxy-silane)/Si | Vinyl group | D unit (total)/Si [x/(v + w + x + y)] | D unit (total)/T unit [x/w] | Si-H/Si | Si-C-C-Si/Si | (y1 + y2)/(v + w + x + y) | (x1 + x2)/(v + w + x + y) | w/(v + w + x + y) | y/(v + w + x + y) |
|---|---|---|---|---|---|---|---|---|---|---|---|---|---|---|
| Example | P1 | 20 | 2 | 0 | 0.00 | 2 | 0.40 | 1.00 | 0.00 | 0.10 | 0.20 | 0.00 | 0.40 | 0.20 |
| | P2 | 20 | 4 | 0 | 0.00 | 4 | 0.40 | 1.00 | 0.00 | 0.20 | 0.20 | 0.20 | 0.40 | 0.20 |
| | P3 | 21 | 3 | 0 | 0.00 | 2 | 0.38 | 1.00 | 0.05 | 0.10 | 0.24 | 0.00 | 0.38 | 0.24 |
| | P4 | 22 | 4 | 2 | 0.09 | 2 | 0.36 | 0.80 | 0.09 | 0.09 | 0.18 | 0.00 | 0.45 | 0.18 |
| Compar-ative Example | P5 | 6 | 5 | 3 | 0.50 | 1 | 0.00 | 0.00 | 0.67 | 0.17 | 0.33 | 0.00 | 0.67 | 0.33 |
| | P6 | 6.5 | 5 | 3 | 0.46 | 1 | 0.08 | 0.13 | 0.62 | 0.15 | 0.31 | 0.00 | 0.62 | 0.31 |
| | P7 | 23.8 | 4 | 0 | 0.00 | 4 | 0.50 | 1.48 | 0.00 | 0.17 | 0.17 | 0.17 | 0.34 | 0.17 |
| | P8 | 9 | 4 | 2 | 0.22 | 4 | 0.11 | 0.17 | 0.00 | 0.44 | 0.22 | 0.00 | 0.67 | 0.22 |
| | P1 | 19.7 | 1.7 | 0 | 0.00 | 2 | 0.41 | 1.00 | 0.09 | 0.09 | 0.19 | 0.00 | 0.41 | 0.19 |
| | P2 | 19.6 | 3.6 | 0 | 0.00 | 4 | 0.41 | 1.00 | 0.19 | 0.18 | 0.18 | 0.20 | 0.41 | 0.19 |
| | P3 | 20.6 | 2.6 | 0 | 0.00 | 2 | 0.39 | 1.00 | 0.13 | 0.10 | 0.22 | 0.00 | 0.39 | 0.22 |
| | P4 | 21.7 | 3.7 | 2 | 0.09 | 2 | 0.37 | 0.80 | 0.17 | 0.09 | 0.17 | 0.00 | 0.46 | 0.17 |
| | P5 | 4.9 | 3.9 | 3 | 0.76 | 1 | 0.00 | 0.00 | 0.80 | 0.20 | 0.19 | 0.00 | 0.81 | 0.19 |
| | P6 | 5.7 | 4.1 | 3 | 0.53 | 1 | 0.09 | 0.13 | 0.72 | 0.18 | 0.19 | 0.00 | 0.70 | 0.19 |
| | P7 | 23.4 | 3.6 | 0 | 0.00 | 4 | 0.50 | 1.48 | 0.15 | 0.15 | 0.07 | 0.17 | 0.34 | 0.15 |
| | P8 | 8.6 | 3.6 | 2 | 0.23 | 4 | 0.12 | 0.17 | 0.42 | 0.40 | 0.18 | 0.00 | 0.69 | 0.19 |

Second Embodiment

Film-forming compositions of Examples were produced by weighing out 0.5 g of each of polysiloxanes P1 to P4 and polysiloxanes P5 to P8 of Comparative Examples f to 4 synthesized in the first Embodiment, adding solvents at quantities whereby the ratio (NV: mass 5 ratio (%) of resin relative to the total mass of resin and solvent) of resins (polysiloxanes and silicone oils) stipulated in Tables 3 and 4 were ultimately achieved, adding silicone oils at the mass ratios shown in Table 3 and Table 4 below (shown as P:Si (polysiloxane: silicone oil)=5:1 etc.), and then mixing. In addition, film-forming compositions comprising only silicone oils were produced in Comparative Examples 5 to 7. General descriptions of silicone oils used in the film-forming compositions are given below.

TABLE 3

| | | | | | | Contact Angle° ($H_2O$/Oleic Acid) | | | | | |
|---|---|---|---|---|---|---|---|---|---|---|---|
| | | | | | | Substrate: Enamel | | Substrate: SUS | | Substrate: Glass | |
| Types of Polysiloxanes (P) | Sample number | Silicone Oil (Si) | P:Si | Resin Fraction (In Heptan solution) | Thickness μm | After Curing | After heat treatment 400° C. 24 h | After Curing | After heat treatment 400° C. 24 h | After Curing | After heat treatment 400° C. 24 h |
| Example 1 P1 | 1 | — | 5:0 | 12.5% | 0.1 | | | /54 | /47 | | |
| | 2 | A | 5:1 | 50.0% | 1.2 | | /52 | | | | |
| | 3 | A | 5:1 | 60.0% | 1.4 | | /52 | | | | |
| | 4 | A | 5:1 | 70.0% | 1.5 | | /51 | | | | |
| | 5 | A | 5:1 | 12.5% | 0.1 | | /50 | | | | |
| | 6 | A | 5:1 | 25.0% | 0.3 | | /51 | | | | |
| | 7 | A | 5:1 | 100.0% | 2.9 | | /51 | | | | |
| | 8 | A | 5:1 | 25.0% | 0.6 | /58 | /52 | | | | |
| | 9 | B | 5:1 | 12.5% | 0.3 | 109/61 | 98/42 | | | | |
| | 10 | B | 5:1 | 25.0% | 0.9 | 108/59 | 104/52 | | | | |
| | 11 | A | 5:1 | 100.0% | 2.4 | | | | /53 | | |
| | 12 | A | 5:1 | 70.0% | 1.5 | | | | /50 | | |
| | 13 | A | 5:1 | 12.5% | 0.0 | | | /56 | /49 | | |
| | 14 | A | 5:1 | 50.0% | 0.7 | | | | /53 | | |
| | 15 | A | 5:1 | 25.0% | 0.3 | | | | /54 | | |
| | 16 | A | 5:1 | 12.5% | 0.04 | | | | /44 | | |
| | 17 | B | 5:1 | 50.0% | 0.9 | | | | /50 | | |
| | 18 | B | 5:1 | 25.0% | 0.2 | | | | /50 | | |
| | 19 | B | 5:1 | 12.5% | 0.1 | | | | /56 | | |
| | 20 | D | 5:1 | 50.0% | 0.7 | | | | /50 | | |
| | 21 | D | 5:1 | 25.0% | 0.2 | | | | /53 | | |
| | 22 | D | 5:1 | 12.5% | 0.1 | | | | /53 | | |
| Example 2 P2 | 23 | — | 5:0 | 25.0% | 0.4 | /53 | /45 | | | | |
| | 24 | — | 5:0 | 12.5% | 0.1 | | | /50 | | | |
| | 25 | A | 5:1 | 25.0% | 0.4 | /56 | /50 | | | | |
| | 26 | A | 5:1 | 25.0% | 0.6 | | /51 | | | | |
| | 27 | A | 5:1 | 12.5% | 0.3 | | | | | /55 | /50 |
| | 28 | C | 5:1 | 12.5% | 0.4 | /59 | /52 | | | | |
| | 29 | C | 5:1 | 12.5% | 0.4 | /62 | /55 | | | | |
| Example 3 P3 | 30 | A | 5:1 | 50.0% | 1.8 | 107/57 | 103/51 | | | | |
| | 31 | A | 5:1 | 25.0% | 0.7 | 106/54 | 101/51 | | | | |
| Example 4 P4 | 32 | A | 5:1 | 50.0% | 2.5 | 106/58 Peeled | 37/20 Peeled | | | | |
| | 33 | A | 5:1 | 25.0% | 1 | 104/57 | 92/41 | | | | |

TABLE 4

| Types of Polysiloxanes (P) | | Sample number | Silicone Oil (Si) | P:Si | Resin Fraction (In Heptan solution) | Thickness μm | Contact Angle° (H₂O/Oleic Acid) | | | | | |
|---|---|---|---|---|---|---|---|---|---|---|---|---|
| | | | | | | | Substrate: Enamel | | Substrate: SUS | | Substrate: Glass | |
| | | | | | | | After Curing | After heat treatment 400° C. 24 h | After Curing | After heat treatment 400° C. 24 h | After Curing | After heat treatment 400° C. 24 h |
| Comparative | P5 | 1 | A | 5:1 | 25.0% | 1 | | | | /13 | | |
| Example 1 | | 2 | A | 5:1 | 12.5% | 0.3 | | | | /15 | | |
| Comparative | P6 | 3 | A | 5:1 | 12.5% | 0.5 | | /16 | | | | |
| Example 2 | | 4 | A | 5:1 | 25.0% | 1.2 | | | | /15 | | |
| | | 5 | A | 5:1 | 12.5% | 0.4 | | | | /15 | | |
| | | 6 | A | 5:1 | 12.5% | 0.6 | | | | | /45 | /21 |
| Comparative | P7 | 7 | — | 5:0 | 15.0% | 0.8 | 104/57 | | | | | |
| Example 3 | | 8 | — | 5:0 | 15.0% | 0.6 | | 34/17 | | | | |
| Comparative | P8 | 9 | A | 5:1 | 12.5% | 0.4 | | /13 | | | | |
| Example 4 | | 10 | A | 5:1 | 25.0% | 1 | | | | /12 | | |
| | | 11 | A | 5:1 | 12.5% | 0.2 | | | | /12 | | |
| | | 12 | A | 5:1 | 12.5% | 0.6 | | | | | /39 | /18 |
| Comparative | | 13 | A | 0:10 | 25.0% | 1 | | | | | /68* | 12 |
| Example 5 | | 14 | A | 0:10 | 12.5% | 0.4 | | | | | * | /21 |
| Comparative | | 15 | B | 0:10 | 25.0% | 2.1 | | | | | /64* | 1B |
| Example 6 | | 16 | B | 0:10 | 12.5% | 0.8 | | | | | * | /19 |
| Comparative | | 17 | C | 0:10 | 25.0% | 1.4 | | | | | /60* | 22 |
| Example 7 | | 18 | C | 0:10 | 12.5% | 0.3 | | | | | * | /21 |

*Insufficient curing
(1) Silicone oil A: Silicone oil silanol-modified at both terminals, Mn 1800, Mw 4000
(2) Silicone oil B: Silicone oil silanol-modified at both terminals, Mn 8600, Mw 22,000
(3) Silicone oil C: Polydimethylsiloxane vinyl-modified at both terminals, Mn 7100, Mw 13,000
(4) Silicone oil D: Silicone oil having methyl group at both terminals, Mn 4400, Mw 6000

Thus produced film-forming compositions were coated on the surface of test pieces measuring approximately 10 cm×10 cm and comprising enamel, stainless steel (SUS304) and glass as substrates by spin coating (600 rpm for 5 seconds and then 1500 rpm for 8 seconds), then dried for 5 minutes at 50° C. so as to distill off the solvent, and then heated for 10 minutes at 200° C., after which the temperature was increased over a period of 15 minutes, and the compositions were then heated for 10 minutes at 350° C. so as to cure the compositions and obtain films having thicknesses shown in Table 3 and Table 4. Moreover, for polysiloxane P1, a film-forming composition was prepared as shown in Table 5, test pieces were obtained using aluminum foil and a polyimide film as substrates, and the composition was coated on a surface of the test pieces measuring 3 cm×10 cm by bar coating (using a #2 bar coater), and apart from this, a film shown in Table 5 was obtained in the same way as on enamel or the like.

The contact angles of the films on these test pieces were measured after being allowed to return to room temperature after curing and after being heated for 24 hours at 400° C. 4 μl-droplets of water and/or oleic acid were added using a contact angle gauge (EKO Instruments Co., Ltd.) having a dynamic imaging function, and the contact angle of the droplets was measured after 10 seconds. Contact angles were measured at five evenly distributed locations on each test piece, and the average value at three locations, excluding the locations having the maximum value and minimum value, was taken to be the measured value. The results are also shown in Table 3 and Table 4.

In addition, when an aluminum foil was used as a test piece, the contact angle was measured before and after a heat treatment comprising heating for 24 hours at 300° C. or heating for 24 hours at 400° C. In addition, when a polyimide film was used as a test piece, the contact angle was measured before and after a heat treatment comprising heating for 15 hours at 350° C. or heating for 30 hours at 350° C. These results are also shown in Table 5.

TABLE 5

| Types of Polysiloxanes (P) | | Sample number | Silicone Oil (Si) | P:Si | Resin Fraction (In Heptan solution) | Thickness μm | Contact Angle° (H₂O/Oleic Acid) Substrate: Aluminum Foil | | |
|---|---|---|---|---|---|---|---|---|---|
| | | | | | | | After Curing | After heat treatment 300° C. 24 h | After heat treatment 400° C. 24 h |
| Example 1 | P1 | 34 | B | 5:1 | 50% | 1.2 | 103/58 | | |
| | | 35 | B | 5:1 | 50% | 1.1 | | 103/59 | |
| | | 36 | B | 5:1 | 50% | 1.1 | | | 105/50 |
| Example 1 | P1 | 37 | B | 5:1 | 50% | 1.1 | /49 | /51 | /41 |

As shown in Table 3 and Table 4, polysiloxanes P1 to P4 could exhibit excellent water repellency and oil repellency on enamel, stainless steel and glass even after being heated for 24 hours at 400° C. That is, it was understood that according to the siloxane compound, it is possible to achieve excellent water repellency and oil repellency according to the type of substrate by specifying the siloxane raw material composition, that is, introducing hydrosilyl groups and unsaturated organic groups into D constituent units and/or M constituent units, making the D structure/Si ratio derived from raw materials 0.3 or more, specifying the amount of D units as the D structure/T structure ratio (for example, approximately 1), specifying the amount of Si—H as the Si—H/Si ratio (for example, 0.1 or less), specifying the amount of Si—C—C—Si as the Si—C—C—Si/Si ratio (for example, approximately 0.05 to 0.2) or blending a silicone oil.

Moreover, with regard to film thickness, it was understood that a film thickness that does not exceed 2 μm is effective from the perspective of adhesion of a film to a substrate.

In addition, as shown in Table 5, polysiloxane P1 can exhibit excellent water repellency and oil repellency on aluminum or a polyimide even after being heated.

Conversely, it was understood that a polysiloxane of a Comparative Examples could only exhibit insufficient water repellency and oil repellency after a film formed on any substrate is heated. In addition, in Comparative Examples 3 and 4, it was thought that good anti-fouling properties could not be exhibited by a silicone oil in a cured film because the silicone oil was introduced into a polysiloxane using the silicone oil when synthesizing the polysiloxane.

Therefore, it was understood that according to the siloxane compound, it is possible to achieve excellent water repellency and oil repellency in addition to heat resistance of a silsesquioxane by using a silsesquioxane composition.

Third Embodiment

Film-forming compositions of this Embodiment were prepared by using polysiloxanes P1 and P2, which were synthesized in the first Embodiment, as component A (a siloxane compound) and using component B (the linear organopolysiloxane) and component C (the branched organopolysiloxane) according to the compositions shown in Table 6. That is, film-forming compositions of Examples 1A to 18A were obtained by adding a solvent to component A so as to dissolve component A, then adding and dissolving component B, adding component C, and then vigorously stirring. In addition, film-forming compositions of Comparative Examples 1A to 19A were also prepared.

TABLE 6

| | Components | | | Amount, Mass ratio | | | Mass percnetage | | | |
|---|---|---|---|---|---|---|---|---|---|---|
| Example | Component A | Component B. Silicone oil | Component C. Silicone resin | A | B | C | A/(A + C) | B/(A + C) | C/(A + C) | Solvent |
| 1A | P1 | A | A | 9.5 | 2 | 0.5 | 95% | 20% | 5% | Toluene |
| 2A | P1 | A | A | 9 | 2 | 1 | 90% | 20% | 10% | Toluene |
| 3A | P1 | A | A | 8 | 1 | 2 | 80% | 10% | 20% | Toluene |
| 4A | P1 | A | A | 8 | 2 | 2 | 80% | 20% | 20% | Toluene |
| 5A | P1 | B | A | 8 | 2 | 2 | 80% | 20% | 20% | Toluene |
| 6A | P1 | A | A | 8 | 4 | 2 | 80% | 40% | 20% | Toluene |
| 7A | P1 | A | A | 7 | 2 | 3 | 70% | 20% | 30% | Toluene |
| 8A | P1 | A | A | 5 | 2 | 5 | 50% | 20% | 50% | Toluene |
| 9A | P1 | A | A | 3 | 2 | 7 | 30% | 20% | 70% | Toluene |
| 10A | P1 | A | A | 1 | 2 | 9 | 10% | 20% | 90% | Toluene |
| 11A | P1 | A | A | 0.5 | 2 | 9.5 | 5% | 20% | 95% | Toluene |
| 12A | P1 | A | B | 9 | 2 | 1 | 90% | 20% | 10% | MEK |
| 13A | P1 | A | B | 7 | 2 | 3 | 70% | 20% | 30% | MEK |
| 14A | P1 | A | B | 5 | 2 | 5 | 50% | 20% | 50% | MEK |
| 15A | P1 | A | B | 3 | 2 | 7 | 30% | 20% | 70% | MEK |
| 16A | P1 | A | B | 1 | 2 | 9 | 10% | 20% | 90% | MEK |
| 17A | P1 | A | A | 8 | 0.1 | 2 | 80% | 1% | 20% | Toluene |
| 18A | P2 | A | A | 8 | 2 | 2 | 80% | 20% | 20% | Toluene |

| | Components | | | Amount, Mass ratio | | | Mass percnetage | | | |
|---|---|---|---|---|---|---|---|---|---|---|
| Comparative Example | Component A | Component B. Silicone oil | Component C. Silicone resin | A | B | C | A/(A + C) | B/(A + C) | C/(A + C) | Solvent |
| 1A | P1 | A | A | 8 | 6 | 2 | 80% | 60% | 20% | Toluene |
| 2A | P1 | A | — | 10 | 2 | 0 | 100% | 20% | 0% | Toluene |
| 3A | P1 | — | — | 10 | 0 | 0 | 100% | 0% | 0% | Toluene |
| 4A | P1 | A | C | 8 | 2 | 2 | 80% | 20% | 20% | MEK |
| 5A | P1 | A | C | 5 | 2 | 5 | 50% | 20% | 50% | MEK |
| 6A | P1 | A | D | 8 | 2 | 2 | 80% | 20% | 20% | MEK |
| 7A | P1 | A | D | 5 | 2 | 5 | 50% | 20% | 50% | MEK |
| 8A | P1 | A | E | 8 | 2 | 2 | 80% | 20% | 20% | MEK |
| 9A | P1 | A | E | 5 | 2 | 5 | 50% | 20% | 50% | MEK |
| 10A | P1 | A | F | 8 | 2 | 2 | 80% | 20% | 20% | MEK |
| 11A | P1 | A | F | 5 | 2 | 5 | 50% | 20% | 50% | MEK |
| 12A | P1 | A | G | 8 | 2 | 2 | 80% | 20% | 20% | MEK |
| 13A | P1 | A | G | 5 | 2 | 5 | 50% | 20% | 50% | MEK |
| 14A | — | — | A | 0 | 0 | 10 | 0% | 0% | 100% | Toluene |
| 15A | — | A | A | 0 | 2 | 10 | 0% | 20% | 100% | Toluene |

TABLE 6-continued

| | | | | | | | | | | |
|---|---|---|---|---|---|---|---|---|---|---|
| 16A | — | — | B | 0 | 0 | 10 | 0% | 0% | 100% | MEK |
| 17A | — | A | B | 0 | 2 | 10 | 0% | 20% | 100% | MEK |
| 18A | P1 | — | A | 5 | 0 | 5 | 50% | 0% | 50% | Toluene |
| 19A | P1 | — | A | 8 | 0 | 2 | 80% | 0% | 20% | Toluene |

(1) Silicone oil A: Silicone oil silanol-modified at both terminals, Mn 8600, Mw 22,000
(2) Silicone oil B: Silicone oil silanol-modified at both terminals, Mn 1800, Mw 4000
(3) Silicone resin A: Dehydrating condensation type methylphenyl silicone resin comprising T units (Mw 7500)
(4) Silicone resin B: Dehydrating condensation type methylphenyl silicone resin comprising T units and D units (Mw 3000)
(5) Silicone resin C: Dehydrating condensation type methyl silicone resin comprising T units and D units (Mw 1,790,000)
(6) Silicone resin D: Addition polymerization type methylphenyl silicone resin comprising T units, D units and M units (Mw 2820)
(7) Silicone resin E: Addition polymerization type methylphenyl silicone resin comprising T units, D units and M units (Mw 1640)
(8) Silicone resin F: Dehydrating condensation type methylphenyl silicone resin comprising T units, D units and M units (Mw 1400)
(9) Silicone resin G: Addition polymerization type propylphenyl silicone resin comprising T units (Mw 2000)
(10) MEK: Methyl ethyl ketone Thus produced film-forming compositions were coated on the surface of test pieces measuring approximately 10 cm×10 cm and comprising enamel and stainless steel (SUS304) as substrates by spin coating (600 rpm for 5 seconds), then dried for 5 minutes at 50° C. so as to distill off the solvent, and then heated for 10 minutes at 200° C., after which the temperature was increased over a period of 15 minutes, and the compositions were then heated for 10 minutes at 350° C. so as to cure the compositions and obtain films having thicknesses shown in Table 7 and Table 8.

The contact angles (°) of the films on these test pieces were measured after being allowed to return to room temperature after curing (initial) and after being heated for 24 hours at 400° C. 4-μl droplets of water and/or oleic acid were added using a contact angle gauge (EKO Instruments Co., Ltd.) having a dynamic imaging function, and the contact angle of the droplets was measured after 10 seconds. Contact angles were measured at five evenly distributed locations on each test piece, and the average value at three locations, excluding the locations having the maximum value and minimum value, was taken to be the measured value.

Furthermore, a cured film was subjected to an abrasion treatment by placing a 500 g load on BEMCOT M-311 (produced by Asahi Kasei Corporation) and moving the load backwards and forwards a prescribed number of times (1000 times), after which the contact angle was measured in the same way as described above. Furthermore, the state of the film after the abrasion treatment (presence or absence of scratches and detachment, degree of detachment (%)) was observed using a VK-9700 laser microscope produced by Keyence Corporation.

The results are shown in Table 7 and Table 8. Moreover, in Examples in which film thickness is divided into two values by a slash (/) in Table 8, a film having the film thickness to the left of the slash was evaluated in terms of abrasion resistance following an abrasion treatment.

TABLE 7

Substrate: Enamel

| Example | Thickness μm | Water Contact angle, ° | | | Oleic acid Contact angle, ° | | | Abration resistance Membrane detachment |
|---|---|---|---|---|---|---|---|---|
| | | Initial | Heat resistanece | Abration resistance | Initial | Heat resistanece | Abration resistance | |
| 2A | 0.9 | 110 | 108 | 109 | 64 | 47 | 61 | not observed |
| 3A | 1.3 | 110 | 104 | 109 | 62 | 50 | 62 | not observed |
| 4A | 0.8 | — | — | — | 72 | 54 | 42 | not observed |
| 6A | 0.6 | — | — | — | 76 | 45 | 70 | not observed |
| 7A | 1.2 | 109 | 109 | 118 | 63 | 53 | 63 | not observed |
| 8A | 0.9 | — | — | — | 73 | 49 | 66 | not observed |
| 9A | 1.4 | 113 | 105 | 111 | 72 | 49 | 67 | not observed |
| 10A | 1.6 | 112 | 99 | 105 | 72 | 48 | 38 | not observed |
| 12A | 0.9 | — | — | — | 57 | 48 | 50 | not observed |
| 13A | 1.6 | 107 | 101 | 111 | 59 | 40 | 64 | not observed |
| 14A | 1.2 | — | — | — | 60 | 45 | 66 | not observed |
| 17A | 0.8 | 105 | 100 | 102 | 55 | 53 | 57 | not observed |
| 18A | 1.1 | 115 | 114 | 114 | 62 | 57 | 65 | not observed |

Substrate: Enamel

| Comparative Example | Thickness μm | Oleic acid Contact angle, ° | | | Abration resistance Membrane detachment percentage |
|---|---|---|---|---|---|
| | | Initial | Heat resistanece | Abration resistance | |
| 1A | 0.4 | 74 | 13 | 63 | 10> |
| 2A | 0.8 | 60 | 48 | 50 | 100 |
| 3A | 0.5 | 44 | 48 | 56 | 25 |
| 4A | 0.7 | 64 | 12 | 61 | 10> |
| 5A | 0.6 | 63 | 19 | 62 | not observed |
| 6A | 0.5 | 60 | 38 | 61 | 10> |
| 7A | 0.6 | 62 | 14 | 53 | 10> |

TABLE 7-continued

| | | | | | |
|---|---|---|---|---|---|
| 8A | 0.7 | 68 | 13 | 68 | 10> |
| 9A | 0.9 | 73 | 18 | 68 | not observed |
| 10A | 0.6 | 57 | 43 | 59 | 10> |
| 11A | 0.6 | 57 | 40 | 49 | 10> |
| 12A | 0.7 | 59 | 48 | 48 | 90 |
| 13A | 0.8 | 59 | 42 | 42 | 50 |
| 14A | 0.4 | 31 | 19 | 21 | 25 |
| 15A | 0.6 | 44 | 17 | 37 | not observed |
| 16A | 1.9 | 33 | 21 | 18 | not observed |
| 17A | 0.9 | 45 | 22 | 39 | not observed |

TABLE 8

Substrate: Stainless

| Example | Thickness μm | Water Contact angle, ° | | | Oleic acid Contact angle, ° | | | Abration resistance Membrane detachment |
|---|---|---|---|---|---|---|---|---|
| | | Initial | Heat resistanece | Abration resistance | Initial | Heat resistanece | Abration resistance | |
| 1A | 1.1 | 107 | 104 | 115 | 59 | 45 | 60 | not observed |
| 2A | 1.1 | 110 | 107 | 111 | 62 | 50 | 63 | not observed |
| 3A | 1.5 | 108 | 85 | 109 | 62 | 50 | 62 | not observed |
| 4A | 1.4 | 114 | 102 | 113 | 66 | 51 | 52 | not observed |
| 5A | 1.7/1.1 | 105 | 97 | 111 | 56 | 38 | 62 | not observed |
| 7A | 1.3 | 113 | 110 | 112 | 62 | 49 | 62 | not observed |
| 9A | 1.1 | 113 | 109 | 108 | 69 | 52 | 48 | not observed |
| 10A | 1.3 | 110 | 110 | 110 | 68 | 48 | 48 | not observed |
| 11A | 1.4/1.4 | 109 | 106 | 108 | 65 | 41 | 45 | not observed |
| 13A | 1.2 | 105 | 101 | 111 | 56 | 45 | 59 | not observed |
| 15A | 2.2/1.7 | 103 | 100 | 108 | 55 | 41 | 53 | not observed |
| 16A | 2.0/1.8 | 107 | 98 | 108 | 62 | 37 | 40 | not observed |

Substerate: Stainless

| Comparative Example | Thickness μm | Water Contact angle, ° | | | Oleic acid Contact angle, ° | | | Abration resistance Membrane detachment |
|---|---|---|---|---|---|---|---|---|
| | | Initial | Heat resistanece | Abration resistance | Initial | Heat resistanece | Abration resistance | |
| 2A | 0.9 | 105 | 100 | 100 | 56 | 45 | 49 | 100 |
| 3A | 1 | 102 | 75 | 109 | 54 | 19 | 54 | 25 |
| 14A | 1.2 | 89 | 63 | 82 | 36 | 21 | 25 | unconfirmed |
| 15A | 1.1 | 109 | 92 | 105 | 65 | 27 | 43 | unconfirmed |
| 18A | 1.4/1.4 | 98 | 83 | 108 | 53 | 11 | 38 | unconfirmed |
| 19A | 1.4/1.8 | 100 | 49 | 123 | 51 | 22 | 55 | unconfirmed |

As shown in Table 7 and Table 8, by incorporating component A, component B and component C, it is possible to exhibit excellent water repellency and oil repellency on enamel and stainless steel surfaces even after heating for 24 hours at 400° C. In addition, it was understood that even after an abrasion treatment, a satisfactory film state could be maintained with no detachment, meaning that this film could exhibit sufficient water repellency and oil repellency even after an abrasion treatment.

Conversely, in Comparative Examples, compositions in which component B was present could not be prepared, but it was understood that if the amount of component B was too high, heat-resistant anti-fouling properties tended to deteriorate. In addition, in cases where component C was not present, it was understood that satisfactory abrasion resistance could not be achieved. Therefore, it was understood that by incorporating component A, component B and component C, it is possible to simultaneously achieve heat-resistant anti-fouling properties and abrasion resistance on enamel and stainless steel surfaces. Furthermore, if component C is a dehydrating condensation type silicone resin which has methyl groups and phenyl groups and which comprises only T units or comprises only T units and D units as constituent units, it was understood that it is possible to obtain a film that exhibits excellent heat-resistant anti-fouling properties and abrasion resistance on enamel and stainless steel surfaces.

Fourth Embodiment

Moreover, it is shown below that statements in the present description can be applied in the same way to polysiloxanes P3 to P4 as component A as for polysiloxanes P1 to P2. Table 9 shows the molar ratios of raw materials used in the synthesis of polysiloxanes P1 to P4 and the molar ratios of Si, hydrosilylable Si—H groups and vinyl groups in unsaturated organic groups contained in the raw materials used. In addition, Table 10 shows molar quantities based on charged amounts of the amounts of Si and Si—H groups derived from raw materials, the amount of Si—H groups derived from triethoxysilane, the amount of vinyl groups, the D structure/Si ratio (molar ratio), the D structure/T structure ratio (molar ratio), the Si—H/Si ratio (molar ratio) and the Si—C—C—Si/Si ratio (molar ratio) in the synthesized polysiloxanes.

TABLE 9

| Basic Constituent Unit, etc Raw Materials | | T unit | | | D unit | | | M unit | | Linear Organopolysiloxane | |
|---|---|---|---|---|---|---|---|---|---|---|---|
| | | Triethoxysilane | Triethoxymethylsilane | Trimethoxyvinyl-silane | Dimethoxydimethylsilane | Dimethoxymethylsilane | Dimethoxymethylvinylsilane | 1,1,3,3-Tetramethyldisiloxane | 1,3-Divinyl-1,1,3,3-tetramethyldisiloxane | Silicone oil E | Silicone oil A |
| Characteristic groups derived from raw materials | Si | 1 | 1 | 1 | 1 | 1 | 1 | 2 | 2 | 1 | 1 |
| | H | 1 | 0 | 0 | 0 | 1 | 0 | 2 | 0 | 0 | 0 |
| | Vinyl | 0 | 0 | 1 | 0 | 0 | 1 | 0 | 2 | 0 | 0 |
| Example | P1 | | 8 | | 8 | | | 1 | 1 | | |
| | P2 | | 8 | | 4 | 2 | 2 | 1 | 1 | | |
| | P3 | | 8 | | 8 | | | 1.5 | 1 | | |
| | P4 | 2 | 8 | 2 | 8 | | | 1 | 1 | | |

TABLE 10

| Ratio | | Si | Si-H group | Si-H (Derived from Triethoxysilane) | Si-H (Derived from Triethoxysilane)/Si | Vinyl group | D unit (total)/Si [x/(v + w + x + y)] | D unit (total)/T unit [x/w] | Si-H/Si | Si-C-C-Si/Si | (y1 + y2)/(v + w + x + y) | (x1 + x2)/(v + w + x + y) | w/(v + w + x + y) | y/(v + w + x + y) |
|---|---|---|---|---|---|---|---|---|---|---|---|---|---|---|
| Ratio based on the charged amount | P1 | 20 | 2 | 0 | 0.00 | 2 | 0.40 | 1.00 | 0.00 | 0.10 | 0.20 | 0.00 | 0.40 | 0.20 |
| | P2 | 20 | 4 | 0 | 0.00 | 4 | 0.40 | 1.00 | 0.00 | 0.20 | 0.20 | 0.20 | 0.40 | 0.20 |
| | P3 | 21 | 3 | 0 | 0.00 | 2 | 0.38 | 1.00 | 0.05 | 0.10 | 0.24 | 0.00 | 0.38 | 0.24 |
| | P4 | 22 | 4 | 2 | 0.09 | 2 | 0.36 | 0.80 | 0.09 | 0.09 | 0.18 | 0.00 | 0.45 | 0.18 |
| Ratio based on NMR analysis | P1 | 19.7 | 1.7 | 0 | 0.00 | 2 | 0.41 | 1.00 | 0.09 | 0.09 | 0.19 | 0.00 | 0.41 | 0.19 |
| | P2 | 19.6 | 3.6 | 0 | 0.00 | 4 | 0.41 | 1.00 | 0.19 | 0.18 | 0.18 | 0.20 | 0.41 | 0.19 |
| | P3 | 20.6 | 2.6 | 0 | 0.00 | 2 | 0.39 | 1.00 | 0.13 | 0.10 | 0.22 | 0.00 | 0.39 | 0.22 |
| | P4 | 21.7 | 3.7 | 2 | 0.09 | 2 | 0.37 | 0.80 | 0.17 | 0.09 | 0.17 | 0.00 | 0.46 | 0.17 |

Film-forming compositions of Examples were prepared by using synthesized polysiloxanes P1 to P4 as component A and using component B according to the compositions shown in Table 11. That is, film-forming compositions were produced by weighing out 0.5 g of each of polysiloxanes P1 to P4, adding solvents at quantities whereby the ratio (NV: mass ratio (%) of resin relative to the total mass of resin and solvent) of resins (polysiloxanes and silicone oils) stipulated in Table 11 were ultimately achieved, adding silicone oils at the mass ratios shown in Table 5 below (shown as P:Si (polysiloxane: silicone oil)=5:1 etc.), and then mixing. These compositions were coated on the surface of test pieces measuring approximately 10 cm×10 cm and comprising enamel, stainless steel (SUS304) and glass as substrates by spin coating (600 rpm for 5 seconds and then 1500 rpm for 8 seconds), then dried for 5 minutes at 50° C. so as to distill off the solvent, and then heated for 10 minutes at 200° C., after which the temperature was increased over a period of 15 minutes, and the compositions were then heated for 10 minutes at 350° C. so as to cure the compositions and obtain films having thicknesses shown in Table 5. These films were evaluated in terms of contact angle of water and oleic acid in accordance with the Embodiment above after production of a cured film (initial) and after a heat treatment (400° C. for 24 hours). The results are shown in Table 11.

TABLE 11

| | | | | | | Contact Angle° (H₂O/Oleic Acid) | | | | | |
|---|---|---|---|---|---|---|---|---|---|---|---|
| | | | | | | Substrate: Enamel | | Substrate: SUS | | Substrate: Glass | |
| Types of Polysiloxianes (P) | Sample number | Silicone Oil (Si) | P:Si | Resin Fraction (In Heptan solution) | Thickness μm | After Curing | After heat treatment 400° C. 24 h | After Curing | After heat treatment 400° C. 24 h | After Curing | After heat treatment 400° C. 24 h |
| P1 | 1 | A | 5:1 | 25.0% | 0.9 | 108/59 | 104/52 | | | | |
| | 2 | B | 5:1 | 12.5% | 0.1 | | | /56 | /49 | | |
| P2 | 3 | B | 5:1 | 12.5% | 0.3 | | | | | /55 | /50 |
| P3 | 4 | B | 5:1 | 50.0% | 1.8 | 107/57 | 103/51 | | | | |
| P4 | 5 | B | 5:1 | 25.0% | 1 | 104/57 | 92/41 | | | | |

As shown in Table 11, even in compositions that do not contain the silicone resin of component C, it was understood that polysiloxanes P1 to P4 all exhibit good heat-resistant anti-fouling properties on a variety of substrate surfaces. Therefore, it was understood that the composition, which contains these polysiloxanes P1 to P4 as component A and further contains component B and component C, can exhibit excellent heat-resistant anti-fouling properties and abrasion resistance.

The invention claimed is:

1. A structure comprising:
a substrate having a surface that is exposed to heat, and
a coating of a composition, or a coating of a cured form of the composition, which is provided on at least a part of the surface, the composition comprising:
a siloxane compound represented by formula (1):

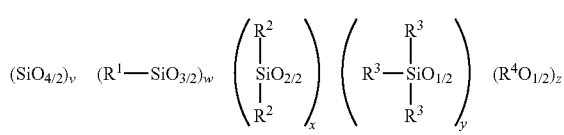

wherein
w and x each denote a positive number,
v, y and z each denote 0 or a positive number,
the value of x/(v+w+x+y) is 0.2 or more,
each $R^1$ denotes at least one group selected from the group consisting of alkyl groups having 1 to 10 carbon atoms,
each $R^2$ denotes at least one atom or group that is selected from the group consisting of a hydrogen atom, organic groups having 2 to 10 carbon atoms and a carbon-carbon unsaturated bond that is able to be hydrosilylated, and alkyl groups having 1 to 10 carbon atoms, where the $R^2$ groups in a single molecule may be the same as, or different from, each other,
each $R^3$ denotes at least one atom or group that is selected from the group consisting of a hydrogen atom, organic groups having 2 to 10 carbon atoms and a carbon-carbon unsaturated bond that is able to be hydrosilylated, and alkyl groups having 1 to 10 carbon atoms, where the $R^3$ groups in a single molecule may be the same as, or different from, each other,
each $R^4$ denotes an alkyl group having 1 to 6 carbon atoms,
at least some of the $R^2$ groups or at least some of the $R^3$ groups are hydrogen atoms and organic groups having 2 to 10 carbon atoms and a carbon-carbon unsaturated bond that is able to be hydrosilylated, and
the number average molecular weight of the siloxane compound is 500 or more and 2000 or less.

2. The structure according to claim 1, wherein at least a part of $(R^3)_3SiO_{1/2}$ moieties are such that one $R^3$ group is a hydrogen atom and the other two $R^3$ groups are alkyl groups having 1 to 10 carbon atoms, and at least another part of $(R^3)_3SiO_{1/2}$ moieties are such that one $R^3$ group is an organic group having 2 to 10 carbon atoms and a carbon-carbon unsaturated bond that is able to be hydrosilylated and the other two $R^3$ groups are alkyl groups having 1 to 10 carbon atoms.

3. The structure according to claim 1, wherein the value of (y1+y2)/(v+w+x+y) is 0.1 or more, where y1 denotes the number of moles of the at least a part of $(R^3)_3SiO_{1/2}$ moieties and y2 denotes the number of moles of the at least another part of $(R^3)_3SiO_{1/2}$ moieties.

4. A structure comprising:
a substrate having a surface that is exposed to heat, and
a coating of a composition, or a coating of a cured form of the composition, which is provided on at least a part of the surface, the composition comprising:
a siloxane compound represented by formula (1):

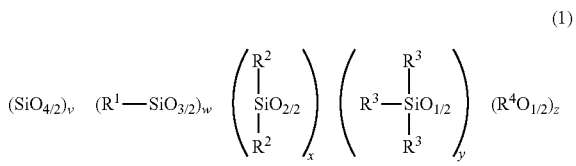

wherein
w and x each denote a positive number,
v, y and z each denote 0 or a positive number,
the value of x/(v+w+x+y) is 0.2 or more,
each R denotes at least one atom or group that is selected from the group consisting of a hydrogen atom, organic groups having 2 to 10 carbon atoms and a carbon-carbon unsaturated bond that is able to be hydrosilylated, and alkyl groups having 1 to 10 carbon atoms,
each $R^2$ denotes at least one atom or group that is selected from the group consisting of a hydrogen atom, organic groups having 2 to 10 carbon atoms and a carbon-carbon unsaturated bond that is able to be hydrosilylated, and alkyl groups having 1 to 10 carbon atoms, where the $R^2$ groups in a single molecule may be the same as, or different from, each other,
each $R^3$ denotes at least one atom or group that is selected from the group consisting of a hydrogen atom, organic groups having 2 to 10 carbon atoms and a carbon-carbon unsaturated bond that is able to be hydrosilylated, and alkyl groups having 1 to 10 carbon atoms, where the $R^3$ groups in a single molecule may be the same as, or different from, each other,
each $R^4$ denotes an alkyl group having 1 to 6 carbon atoms, and
at least some of the $R^2$ groups or at least some of the $R^3$ groups are hydrogen atoms and organic groups having 2 to 10 carbon atoms and a carbon-carbon unsaturated bond that is able to be hydrosilylated, and
wherein at least a part of $(R^2)_2SiO_{2/2}$ moieties are such that one $R^2$ group is a hydrogen atom and the other $R^2$ group is an alkyl group having 1 to 10 carbon atoms, and at least another part of $(R^2)_2SiO_{2/2}$ moieties are such that one $R^2$ group is an organic group having 2 to 10 carbon atoms and a carbon-carbon unsaturated bond that is able to be hydrosilylated and the other $R^2$ group is an alkyl group having 1 to 10 carbon atoms.

5. The structure according to claim 4, wherein the value of (x1+x2)/(v+w+x+y) is 0.1 or more, where x1 denotes the number of moles of the at least a part of $(R^2)_2SiO_{2/2}$ moieties and x2 denotes the number of moles of the at least another part of $(R^2)_2SiO_{2/2}$ moieties.

6. The structure according to claim 1, wherein the value of x/w is 0.8 or more.

7. The structure according to claim 1, wherein the siloxane compound is constituted so that the number of moles of Si—C—C—$R_m$—Si, where R is an organic group having 1 to 8 carbon atoms and m is an integer of 0 or 1, derived from a hydrosilylation reaction between a hydrogen atom and an organic group having 2 to 10 carbon atoms and a carbon-carbon unsaturated bond that is able to be hydrosilylated is 0.05 or more and 0.3 or less of the total number of moles of Si in the siloxane compound.

8. A structure comprising:
a substrate having a surface that is exposed to heat, and
a coating of a composition, or a coating of a cured form of the composition, which is provided on at least a part of the surface, the composition comprising:
a siloxane compound represented by formula (1):

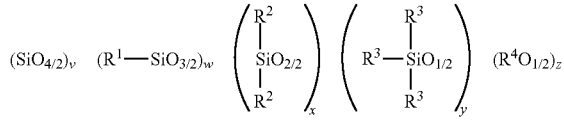

(1)

wherein
w and x each denote a positive number,
v, y and z each denote 0 or a positive number,
the value of $x/(v+w+x+y)$ is 0.2 or more,
each R denotes at least one atom or group that is selected from the group consisting of a hydrogen atom, organic groups having 2 to 10 carbon atoms and a carbon-carbon unsaturated bond that is able to be hydrosilylated, and alkyl groups having 1 to 10 carbon atoms,
each $R^2$ denotes at least one atom or group that is selected from the group consisting of a hydrogen atom, organic groups having 2 to 10 carbon atoms and a carbon-carbon unsaturated bond that is able to be hydrosilylated, and alkyl groups having 1 to 10 carbon atoms, where the $R^2$ groups in a single molecule may be the same as, or different from, each other,
each $R^3$ denotes at least one atom or group that is selected from the group consisting of a hydrogen atom, organic groups having 2 to 10 carbon atoms and a carbon-carbon unsaturated bond that is able to be hydrosilylated, and alkyl groups having 1 to 10 carbon atoms, where the $R^3$ groups in a single molecule may be the same as, or different from, each other,
each $R^4$ denotes an alkyl group having 1 to 6 carbon atoms,
at least some of the $R^2$ groups or at least some of the $R^3$ groups are hydrogen atoms and organic groups having 2 to 10 carbon atoms and a carbon-carbon unsaturated bond that is able to be hydrosilylated, and
the number average molecular weight of the siloxane compound is 500 or more and 2000 or less, and
wherein in the siloxane compound, the number of moles of hydrogen atoms that are in a theoretical excess over the organic group having 2 to 10 carbon atoms and a carbon-carbon unsaturated bond that is able to be hydrosilylated is 0.1 or less relative to the total number of moles of Si.

9. The structure according to claim 1, wherein in the siloxane compound, a Si—C—C—$R_m$—Si structure, where R is an organic group having 1 to 8 carbon atoms and m is an integer of 0 or 1, is formed by at least a part of the organic groups having 2 to 10 carbon atoms and a carbon-carbon unsaturated bond that is able to be hydrosilylated and at least a part of the hydrogen atoms.

10. A structure comprising:
a substrate having a surface that is exposed to heat, and
a coating of a composition, or a coating of a cured form of the composition, which is provided on at least a part of the surface, the composition comprising:
a siloxane compound represented by formula (1):

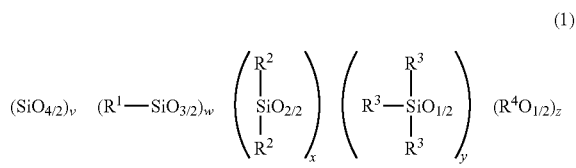

(1)

wherein
w and x each denote a positive number,
v, y and z each denote 0 or a positive number,
the value of $x/(v+w+x+y)$ is 0.2 or more,
each R denotes at least one atom or group that is selected from the group consisting of a hydrogen atom, organic groups having 2 to 10 carbon atoms and a carbon-carbon unsaturated bond that is able to be hydrosilylated, and alkyl groups having 1 to 10 carbon atoms,
each $R^2$ denotes at least one atom or group that is selected from the group consisting of a hydrogen atom, organic groups having 2 to 10 carbon atoms and a carbon-carbon unsaturated bond that is able to be hydrosilylated, and alkyl groups having 1 to 10 carbon atoms, where the $R^2$ groups in a single molecule may be the same as, or different from, each other,
each $R^3$ denotes at least one atom or group that is selected from the group consisting of a hydrogen atom, organic groups having 2 to 10 carbon atoms and a carbon-carbon unsaturated bond that is able to be hydrosilylated, and alkyl groups having 1 to 10 carbon atoms, where the $R^3$ groups in a single molecule may be the same as, or different from, each other,
each $R^4$ denotes an alkyl group having 1 to 6 carbon atoms, and
at least some of the $R^2$ groups or at least some of the $R^3$ groups are hydrogen atoms and organic groups having 2 to 10 carbon atoms and a carbon-carbon unsaturated bond that is able to be hydrosilylated, and
wherein the composition further comprises a linear organopolysiloxane component represented by formula (3):

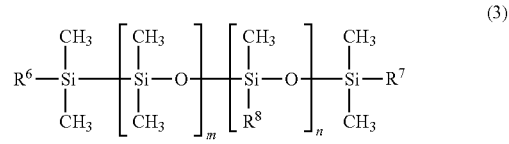

(3)

wherein
$R^6$ and $R^7$ are each independently at least one member selected from among a hydroxyl group, an alkyl group having 1 to 3 carbon atoms, an alkoxy group having 1 to 3 carbon atoms, an amino group, an epoxy group, a mercapto group, a carboxyl group, a polyether group, a phenyl group, a (meth)acrylic group, a carbinol group and a carboxylic acid anhydride group, where the $R^6$ and $R^7$ groups may be the same as, or different from, each other,
$R^8$ is at least one member selected from among an alkyl group having 1 to 20 carbon atoms, a phenyl group, a polyether group, an aralkyl group, a fluoroalkyl group, a fatty acid ester group and a fatty acid amide group, m is an integer of 1 or more, and n is an integer of 1 or more.

11. The structure according to claim 10, wherein the composition further comprises a branched organopolysiloxane represented by formula (4):

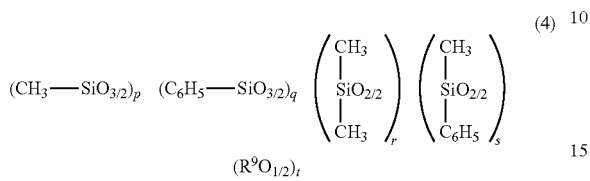

wherein p>0, q>0, r≥0, s≥0, and (p+2r+s)>q+s, and $R^9$ is a hydrogen atom or an alkyl group having 1 to 6 carbon atoms.

12. The structure according to claim 1, wherein the composition comprises substantially no hydrochloric acid or alkali and/or substantially no catalyst for facilitating hydrosilylation.

13. A method of producing the structure according to claim 1 comprising:

providing at least a part of the surface that is exposed to heat with a composition; and curing the composition that is provided on at least a part of the surface; wherein the composition comprises:

a siloxane compound represented by formula (1):

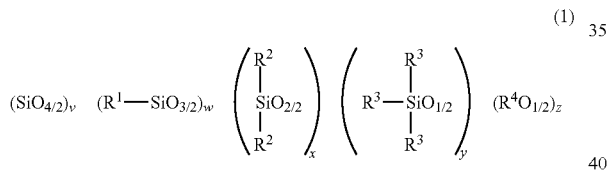

wherein w and x each denote a positive number, v, y and z each denote 0 or a positive number, the value of x/(v+w+x+y) is 0.2 or more, each $R^1$ denotes at least one group selected from the group consisting of alkyl groups having 1 to 10 carbon atoms, each $R^2$ denotes at least one atom or group that is selected from the group consisting of a hydrogen atom, organic groups having 2 to 10 carbon atoms and a carbon-carbon unsaturated bond that is able to be hydrosilylated, and alkyl groups having 1 to 10 carbon atoms, where the $R^2$ groups in a single molecule may be the same as, or different from, each other, each $R^3$ denotes at least one atom or group that is selected from the group consisting of a hydrogen atom, organic groups having 2 to 10 carbon atoms and a carbon-carbon unsaturated bond that is able to be hydrosilylated, and alkyl groups having 1 to 10 carbon atoms, where the $R^3$ groups in a single molecule may be the same as, or different from, each other, each $R^4$ denotes an alkyl group having 1 to 6 carbon atoms, at least some of the $R^2$ groups or at least some of the $R^3$ groups are hydrogen atoms and organic groups having 2 to 10 carbon atoms and a carbon-carbon unsaturated bond that is able to be hydrosilylated, and the number average molecular weight of the siloxane compound is 500 or more and 2000 or less.

14. A siloxane compound represented by formula (1):

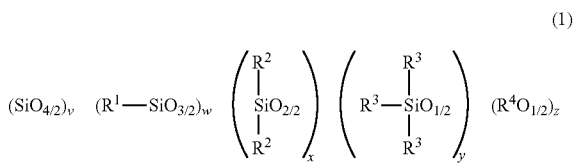

wherein w and x each denote a positive number, v, y and z each denote 0 or a positive number, the value of x/(v+w+x+y) is 0.2 or more, each $R^1$ denotes at least one group selected from the group consisting of alkyl groups having 1 to 10 carbon atoms, each $R^2$ denotes at least one atom or group that is selected from the group consisting of a hydrogen atom, organic groups having 2 to 10 carbon atoms and a carbon-carbon unsaturated bond that is able to be hydrosilylated, and alkyl groups having 1 to 10 carbon atoms, where the $R^2$ groups in a single molecule may be the same as, or different from, each other, each $R^3$ denotes at least one atom or group that is selected from the group consisting of a hydrogen atom, organic groups having 2 to 10 carbon atoms and a carbon-carbon unsaturated bond that is able to be hydrosilylated, and alkyl groups having 1 to 10 carbon atoms, where the $R^3$ groups in a single molecule may be the same as, or different from, each other, each $R^4$ denotes an alkyl group having 1 to 6 carbon atoms, at least some of the $R^2$ groups or at least some of the $R^3$ groups are hydrogen atoms and organic groups having 2 to 10 carbon atoms and a carbon-carbon unsaturated bond that is able to be hydrosilylated, and the number average molecular weight of the siloxane compound is 500 or more and 2000 or less.

15. The siloxane compound according to claim 14, which further has any of characteristics (1) to (4) below:

(1) at least a part of $(R^3)_3SiO_{1/2}$ moieties are such that one $R^3$ group is a hydrogen atom and the other two $R^3$ groups are alkyl groups having 1 to 10 carbon atoms, and at least another part of $(R^3)_3SiO_{1/2}$ moieties are such that one $R^3$ group is an organic group having 2 to 10 carbon atoms and a carbon-carbon unsaturated bond that is able to be hydrosilylated and the other two $R^3$ groups are alkyl groups having 1 to 10 carbon atoms;

(2) the value of (y1+y2)/(v+w+x+y) is 0.1 or more, where y1 denotes the number of moles of the at least a part of $(R^3)_3SiO_{1/2}$ moieties of said (1) and y2 denotes the number of moles of the at least another part of $(R^3)_3SiO_{1/2}$ moieties of said (1);

(3) at least a part of $(R^2)_2SiO_{2/2}$ moieties are such that one $R^2$ group is a hydrogen atom and the other $R^2$ group is an alkyl group having 1 to 10 carbon atoms, and at least another part of $(R^2)_2SiO_{2/2}$ moieties are such that one $R^2$ group is an organic group having 2 to 10 carbon atoms and a carbon-carbon unsaturated bond that is able to be hydrosilylated and the other $R^2$ group is an alkyl group having 1 to 10 carbon atoms; and (4) the value of $(x1+x2)/(v+w+x+y)$ is 0.1 or more, where x1 denotes the number of moles of the at least a part of $(R^2)_2SiO_{2/2}$ moieties of said (3) and x2 denotes the number of moles of the at least another part of $(R^2)_2 SiO_{2/2}$ moieties of said (3).

16. A coating composition, comprising:

a siloxane compound represented by formula (1):

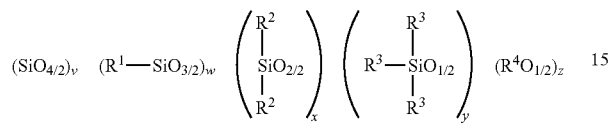

(1)

wherein
- w and x each denote a positive number,
- v, y and z each denote 0 or a positive number,
- the value of $x/(v+w+x+y)$ is 0.2 or more,
- each $R^1$ denotes at least one group selected from the group consisting of alkyl groups having 1 to 10 carbon atoms,
- each $R^2$ denotes at least one atom or group that is selected from the group consisting of a hydrogen atom, organic groups having 2 to 10 carbon atoms and a carbon-carbon unsaturated bond that is able to be hydrosilylated, and alkyl groups having 1 to 10 carbon atoms, where the $R^2$ groups in a single molecule may be the same as, or different from, each other,
- each $R^3$ denotes at least one atom or group that is selected from the group consisting of a hydrogen atom, organic groups having 2 to 10 carbon atoms and a carbon-carbon unsaturated bond that is able to be hydrosilylated, and alkyl groups having 1 to 10 carbon atoms, where the $R^3$ groups in a single molecule may be the same as, or different from, each other,
- each $R^4$ denotes an alkyl group having 1 to 6 carbon atoms,
- at least some of the $R^2$ groups or at least some of the $R^3$ groups are hydrogen atoms and organic groups having 2 to 10 carbon atoms and a carbon-carbon unsaturated bond that is able to be hydrosilylated, w and x each denote a positive number, v, y and z each denote 0 or a positive number, and the value of $x/(v+w+x+y)$ is 0.2 or more, and
- the number average molecular weight of the siloxane compound is 500 or more and 2000 or less; or a coating of a cured form of the composition, which is provided on at least a part of a substrate having a surface that is exposed to heat.

* * * * *